United States Patent
Pedzisz

(10) Patent No.: US 11,727,602 B2
(45) Date of Patent: Aug. 15, 2023

(54) RESOLUTION OF A PICTURE

(71) Applicant: Telefonaktiebolaget LM Ericsson (publ), Stockholm (SE)

(72) Inventor: Maciej Pedzisz, Southampton (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 17/277,607

(22) PCT Filed: Sep. 20, 2018

(86) PCT No.: PCT/EP2018/075523
§ 371 (c)(1),
(2) Date: Mar. 18, 2021

(87) PCT Pub. No.: WO2020/057749
PCT Pub. Date: Mar. 26, 2020

(65) Prior Publication Data
US 2021/0350579 A1    Nov. 11, 2021

(51) Int. Cl.
*G06T 7/00* (2017.01)
*G06T 3/40* (2006.01)
*G06T 5/20* (2006.01)
*G06T 5/50* (2006.01)

(52) U.S. Cl.
CPC ............ *G06T 7/97* (2017.01); *G06T 3/40* (2013.01); *G06T 5/20* (2013.01); *G06T 5/50* (2013.01); *G06T 2207/10016* (2013.01); *G06T 2207/20224* (2013.01)

(58) Field of Classification Search
CPC . G06T 2207/10016; G06T 2207/20016; G06T 2207/20224; G06T 3/40; G06T 5/20; G06T 7/00; G06T 7/97; G06T 5/50
See application file for complete search history.

(56) References Cited

U.S. PATENT DOCUMENTS

2021/0049399 A1* 2/2021 Makino ............... G06T 7/37

OTHER PUBLICATIONS

Nieuwenhuizen, Robert PJ, et al. "Measuring image resolution in optical nanoscopy." Nature methods 10.6 (2013): 557-562.*

(Continued)

*Primary Examiner* — Li Liu
(74) *Attorney, Agent, or Firm* — Murphy, Bilak & Homiller, PLLC

(57) ABSTRACT

A resolution is determined for a picture (10) by repeating determination of a first and second signal power of a first and a second residual signal and a power ratio of the first and second signal powers until the power ratio ($\gamma$) exceeds a threshold value (T). An input signal is initially set as pixel values of the picture (10). The first residual signal is representative of a difference between the input signal and a half-band filtered version thereof and the second residual signal is representative of a difference between a resampled signal and a half-band filtered version thereof. The resampled signal is a downsampled and half-band filtered version of the input signal. The input signal is set as the resampled signal if $\gamma \leq T$. The resolution is then determined based on a resolution of the set input signal when $\gamma > T$.

20 Claims, 21 Drawing Sheets

(56) References Cited

OTHER PUBLICATIONS

Almansa, Andres, Sylvain Durand, and Bernard Rougé. "Measuring and improving image resolution by adaptation of the reciprocal cell." Journal of Mathematical Imaging and vision 21 (2004): 235-279.*

Unknown, Author, "VMAF—Video Multi-method Assessment Fusion", video database, https://github.com/Netflix/vmaf/blob/master/resource/doc/datasets.md, accessed Sep. 6, 2018, 1 page.

Atick, Joseph J., et al., "Towards a Theory of Early Visual Processing", Neural Computation, vol. 2, Issue 3, Massachusetts Institute of Technology, Sep. 1990, pp. 308-320.

Atick, Joseph J., et al., "What Does the Retina Know about Natural Scenes?", Neural Computation, vol. 4, Issue 2, Massachusetts Institute of Technology, Mar. 1992, pp. 196-210.

Author Unknown, "VQEG—Video Quality Experts Group", video database, http://www.cdvl.org/, accessed Sep. 6, 2018, 1 page.

Burt, Peter J., et al., "The Laplacian Pyramid as a Compact Image Code", IEEE Transactions on Communications, vol. COM-31, No. 4, Apr. 1983, pp. 532-540.

Field, David J., "Relations between the statistics of natural images and the response properties of cortical cells", Journal of the Optical Society of America A, vol. 4, No. 12, Dec. 1987, pp. 2379-2394.

Goodman, David J., et al., "Nine Digital Filters for Decimation and Interpolation", IEEE Transactions on Acoustics, Speech, and Signal Processing, vol. 25, No. 2, Apr. 1977, pp. 121-126.

Joy, D. C., "SMART—a program to measure SEM resolution and imaging performance", Journal of Microscopy, vol. 208, Part 1, Oct. 2002, pp. 24-34.

Lin, Joe Yuchieh, et al., "MCL-V: A streaming video quality assessment database", Journal of Visual Communication and Image Representation, vol. 30, Elsevier Inc., Jul. 2015, pp. 1-9.

Proakis, John G., et al., "Digital Signal Processing: Principles, Algorithms, and Applications", Fourth Edition, Pearson Prentice Hall, 2006, pp. 1-1087.

Sheel, Pragati, et al., "Parametric Method Based PSD Estimation using Gaussian Window", International Journal of Engineering Trends and Technology (IJETT), vol. 29, No. 1, Nov. 2015, pp. 18-22.

Wang, Zhou, et al., "Multi-Scale Structural Similarity for Image Quality Assessment", The Thirty-Seventh Asilomar Conference on Signals, Systems & Computers, Pacific Grove, CA, USA, Nov. 9-12, 2003, pp. 1398-1402.

* cited by examiner

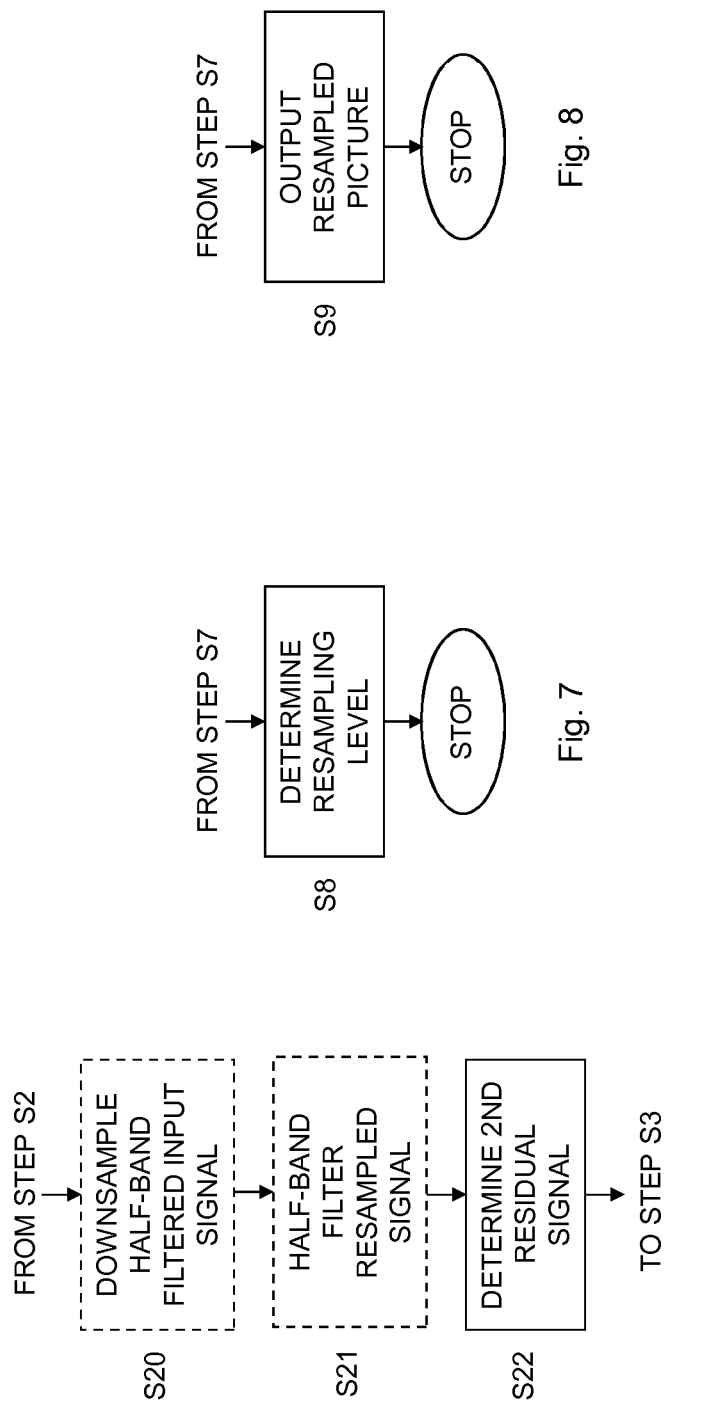

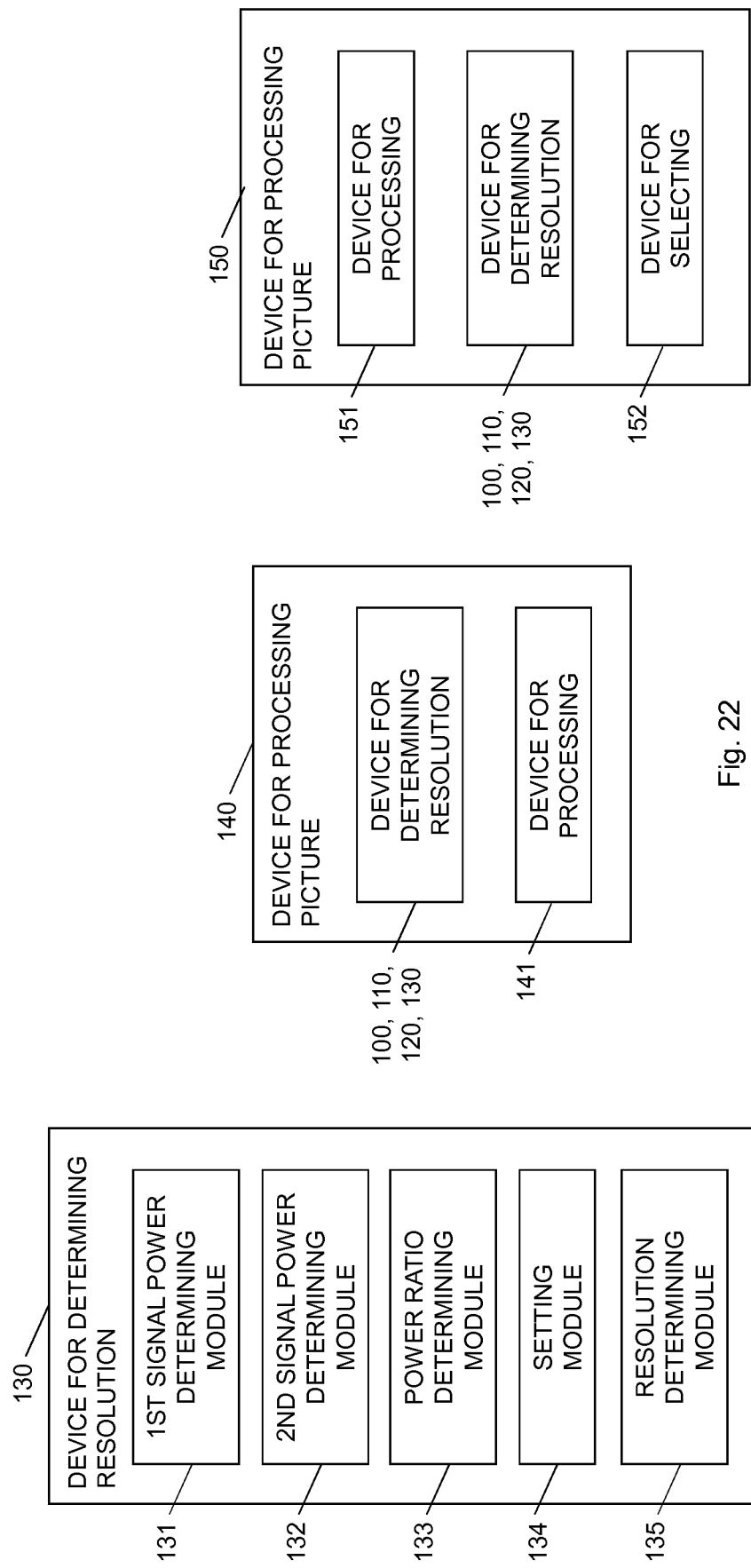

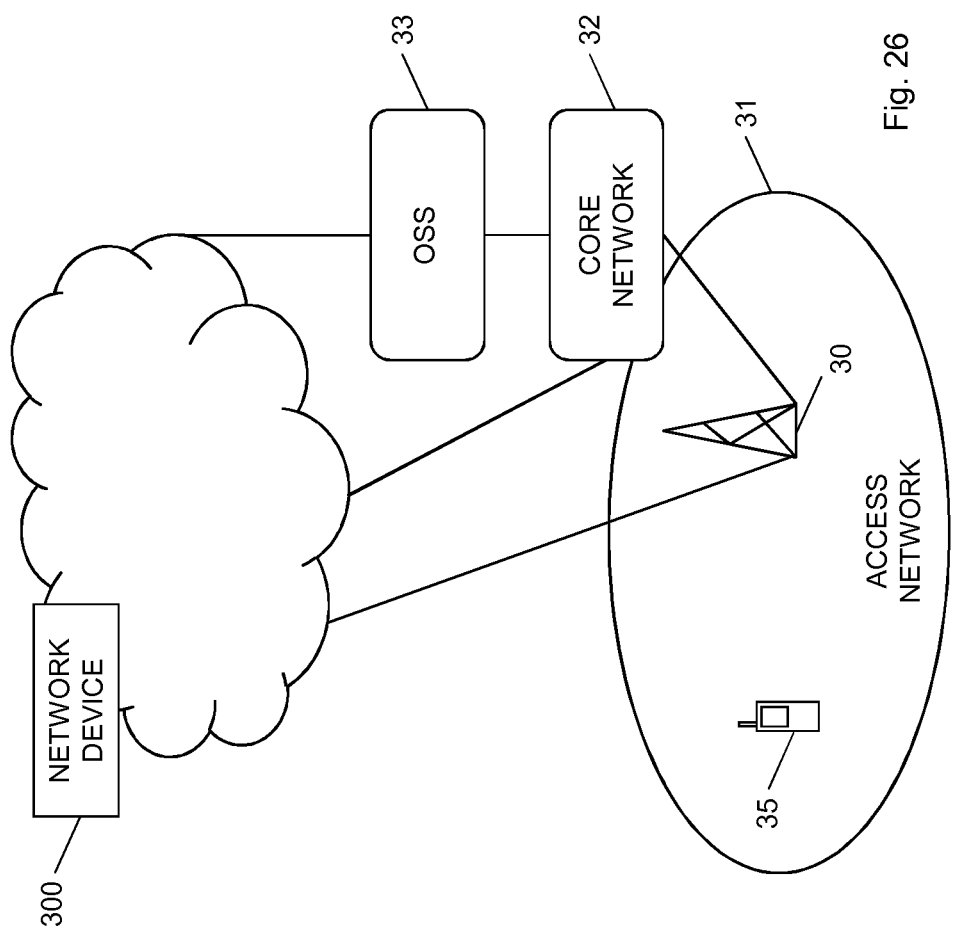

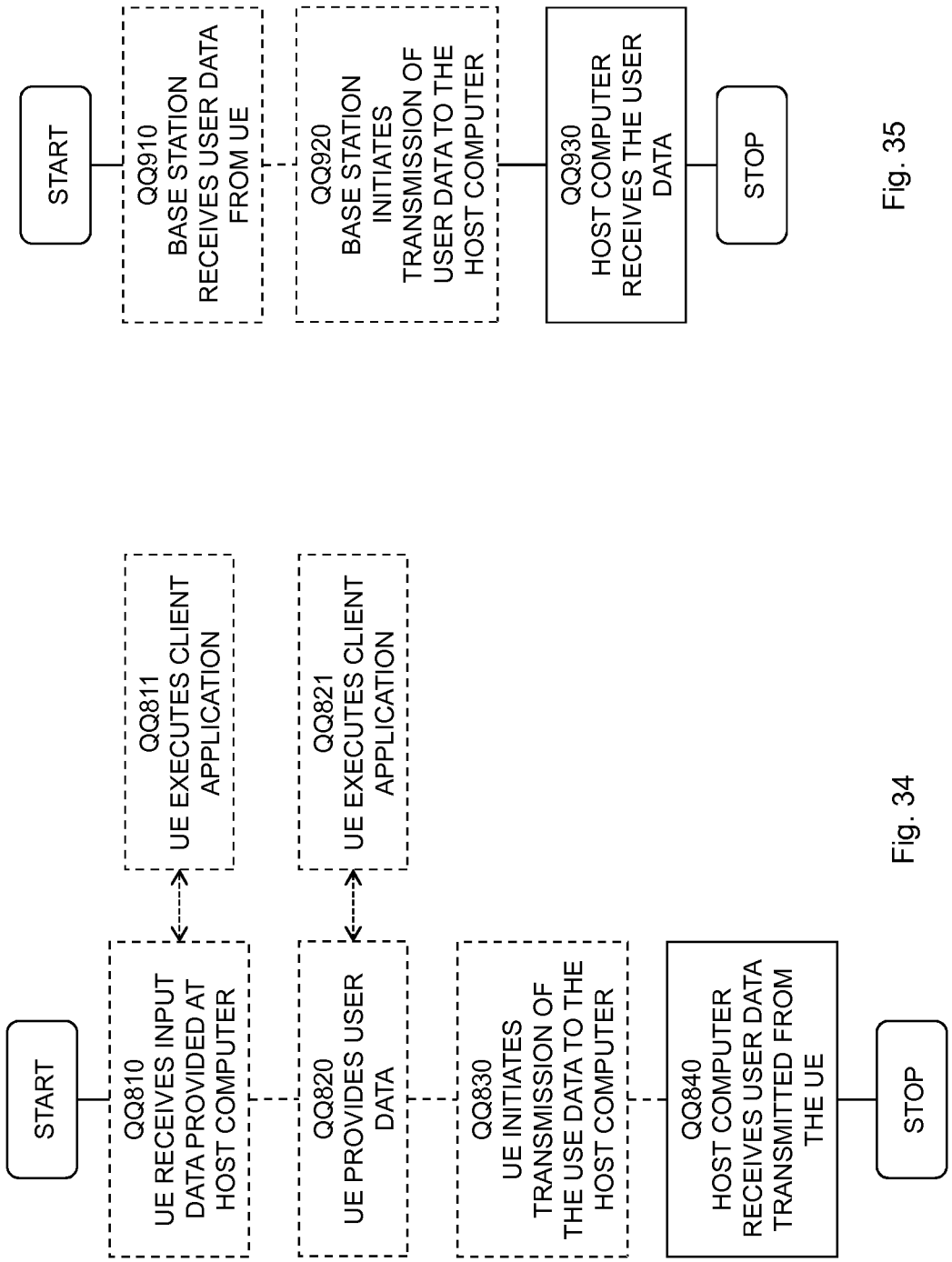

RESOLUTION OF A PICTURE

TECHNICAL FIELD

The invention generally relates to methods, devices, computer program and carrier for determining resolutions for pictures.

BACKGROUND

Most of the current image and video processing applications use input image or video resolution as an invariant feature and perform processing operations without any resizing. This is optimal if the entire processing chain, e.g., pre-filtering, compression, decompression and display, should use the same resolution and/or when image or video degradation due to resampling should be avoided.

By relaxing the above constraints and allowing rescaling operations at various stages of the processing pipeline, big gains can be achieved including, but not limited to:
- reducing computational cost and resources, e.g., attaining "real-time performance" of some image or video processing algorithms;
- trading distortion vs. bit cost, e.g., using low resolution layers to be encoded or transmitted first in scalable image or video compression systems;
- avoiding processing of image or video details that are not important from the human visual system (HVS) perspective, e.g., processing of details that will not be visible because of the distance to display and/or the size or the display; and
- avoiding processing of image or video details that do not add any new information, e.g., if the original content was upscaled at some point in the processing pipeline, then from the information content perspective, it can be downscaled, without any information loss, back to the resolution, at which original content was acquired or produced.

The above-mentioned advantages highlight the importance of knowing the optimal resolution for any given processing task. However, in some situations, this optimal resolution of images or video is not known, e.g., having access only to the output from the last image or video processing stage but no resolution information. In order to get access to the resolution, maximum frequency present in the image or video signal can be estimated using a power spectrum estimation technique. This involves performing a two-dimensional (2D) power spectrum estimation using, most conveniently, a non-parametric, fast Fourier transform (FFT) based estimation or a parametric-based approach like Burg's method. This requires conversion from the 2D spatial domain to the 2D frequency domain, which can be a time-consuming operation for big resolution images or videos, e.g., 3840×2160 images or video frames. Furthermore, power spectra of natural images are proportional to $1/|f|^2$, which makes it hard to identify any discontinuity. In addition, the inverse proportionality relation holds only on average and large variations can be observed in naturally occurring images and videos. The power spectrum varies with signal power so a simple, threshold-based method to identify maximum frequency in the spectrum is unreliable.

Another technique to get access to the resolution is based on processing the image or video signal at different scales and combining the outcome at the very end of the processing pipeline. This approach avoids the resolution identification problem altogether and instead shifts it to the very end of the processing pipeline where the processing outcomes are combined into one final result. This combination may be appropriate for some application types, e.g., combining quality scores calculated at different scales, but it is not a generic solution for applications that require identification of the resolution.

There is, thus, a need for a fast and reliable determination of the resolution for a picture, such as a still image or a frame of a video sequence, and where information of such resolution could be used in various picture processing applications.

SUMMARY

It is a general objective to provide a fast and reliable determination of a resolution for a picture.

This and other objectives are met by aspects of the invention as well as embodiments as disclosed herein.

An aspect of the invention relates to a method of determining a resolution for a picture. In this method, an input signal is initially set as pixel values of the picture. The method comprises performing determinations of first and second single powers and a power ratio until the power ratio exceeds a threshold value. The first signal power is determined as a signal power of a first residual signal representative of a difference between the input signal and a half-band filtered version of the input signal. The second signal power is determined as a signal power of a second residual signal representative of a difference between a resampled signal and a half-band filtered version of the resampled signal. The resampled signal is a downsampled version of the half-band filtered version of the input signal. The power ratio is determined based on the first signal power and the second signal power. The input signal is then set equal to the resampled signal if the power ratio is equal to or below the threshold value. The method also comprises determining the resolution for the picture based on a resolution of the set input signal when the power ratio exceeds the threshold value.

Another aspect of the invention relates to a method of processing a picture. The method comprises determining a resolution for the picture according to above. The method also comprises processing a version of the picture having a resolution corresponding to the resolution to obtain a processing result.

A further aspect of the invention relates to a method of processing a picture. The method comprises processing the picture and at least one downscaled version of the picture to obtain a respective processing result. The method also comprises determining a resolution for the picture according to above. The method further comprises selecting a processing result among the respective processing results based on the resolution.

Yet another aspect of the invention relates to a method of processing a picture. The method comprises processing the picture and at least one downscaled version of the picture to obtain a respective processing result. The method also comprises determining a resolution for the picture according to above. The method further comprises determining weights for the respective processing results based on the resolution. The method additionally comprises determining a processing result for the picture by weighting the respective processing results with the determined weights.

An aspect of the invention relates to a device for determining a resolution for a picture. An input signal is initially set as an original signal of the picture and the device is configured to perform the following operations until a power ratio exceeds a threshold value. The device is configured to determine a first signal power of a first residual signal representative of a difference between the input signal and a half-band filtered version of the input signal. The device is configured to determine a second signal power of a second residual signal representative of a difference between a resampled signal and a half-band filtered version of the resampled signal. The resampled signal is a downsampled version of the half-band filtered version of the input signal. The device is also configured to determine the power ratio based on the first signal power and the second signal power. The device is further configured to set the input signal equal to the resampled signal if the power ratio is equal to or below the threshold value. Once the power ratio exceeds the threshold value, the device is configured to determine the resolution for the picture based on a resolution of the set input signal when the power ratio exceeds the threshold value.

Another aspect of the invention relates to a device for processing a picture. The device comprises a device for determining a resolution for the picture according to above and a device configured to process a version of the picture having a resolution corresponding to the resolution to obtain a processing result.

A further aspect of the invention relates to a device for processing a picture. The device comprises a device configured to process the picture and at least one downscaled version of the picture to obtain a respective processing result. The device also comprises a device for determining a resolution for the picture according to above and a device configured to select a processing result among the respective processing results based on the resolution.

Yet another aspect of the invention relates to a device for processing a picture. The device comprises a device configured to process the picture and at least one downscaled version of the picture to obtain a respective processing result. The device also comprises a device for determining a resolution for the picture according to above and a device configured to determine weights for the respective processing results based on the resolution. The device further comprises a device configured to determine a processing result for the picture by weighting the respective processing results with the determined weights.

A related aspect of the invention defines a network device comprising a device according to above.

An aspect of the invention relates to a computer program comprising instructions, which when executed by at least one processor, cause the at least one processor to, wherein an input signal is initially set as pixel values of a picture, perform, until a power ratio exceeds a threshold value, determining a first signal power of a first residual signal representative of a difference between the input signal and a half-band filtered version of the input signal, determining a second signal power of a second residual signal representative of a difference between a resampled signal and a half-band filtered version of the resampled signal, wherein the resampled signal is a downsampled version of the half-band filtered version of the input signal and determining the power ratio based on the first signal power and the second signal power, and set the input signal equal to the resampled signal if the power ratio is equal to or below the threshold value. The at least one processor is also caused to determine a resolution for the picture based on a resolution of the set input signal when the power ratio exceeds the threshold value.

A related aspect of the invention defines a carrier comprising a computer program according to above. The carrier is one of an electronic signal, an optical signal, an electromagnetic signal, a magnetic signal, an electric signal, a radio signal, a microwave signal, or a computer-readable storage medium.

The present aspects enable a fast and reliable determination of a resolution for a picture at which at least most of the original content of the picture is contained. Accordingly, processing the picture at this resolution will generally not have any detrimental effect on the processing result as compared to processing the picture at its original resolution. The determination of the resolution is based on features that are easy to calculate, robust with respect to content type of the picture and resampling methods used to rescale pictures, as well as invariant to the input signal power.

BRIEF DESCRIPTION OF THE DRAWINGS

The aspects as well as embodiments thereof, together with further objects and advantages thereof, may best be understood by making reference to the following description taken together with the accompanying drawings, in which:

FIG. 6 is a flow chart illustrating additional, optional steps of the method in FIG. 2 according to an embodiment;

FIG. 7 is a flow chart illustrating an additional, optional step of the method in FIG. 2 according to an embodiment;

FIG. 8 is a flow chart illustrating an additional, optional step of the method in FIG. 2 according to an embodiment;

FIG. 21 is a block diagram of a device for determining a resolution according to yet another embodiment;

FIG. 22 is a block diagram of a device for processing a picture according to an embodiment;

FIG. 23 is a block diagram of a device for processing a picture according to another embodiment;

FIG. 26 is a schematic illustration of an example of a wireless communication system with one or more cloud-based network devices according to an embodiment;

FIG. 34 is a flowchart illustrating a method implemented in a communication system in accordance with an embodiment; and FIG. 35 is a flowchart illustrating a method implemented in a communication system in accordance with an embodiment.

DETAILED DESCRIPTION

Throughout the drawings, the same reference numbers are used for similar or corresponding elements.

The invention generally relates to resolution determination, and in particular to determining resolutions for pictures. The resolution determined according to the invention is a resolution at which all or at least most of the original content of the picture is contained. This means that processing the picture at the resolution in a processing application will not have any significant detrimental effect on the processing outcome since relevant content of the picture is still maintained at this resolution. Hence, the resolution is optimal or at least suitable for picture processing applications. The resolution could thereby be regarded as an intrinsic picture resolution since it relates to a resolution, which is internal, embedded or natural for the processing and at which the relevant content is still present in the picture. Thus, any picture resolution or scale above the resolution can be neglected since it does not carry any significant picture content.

The present invention can thereby be used in processing applications when there is no available information of suitable resolution for pictures and thereby such resolution needs to be determined. Such situations can occur when pictures have previously been processed in a processing chain and only processed pictures are available and no resolution information.

Figure 1:
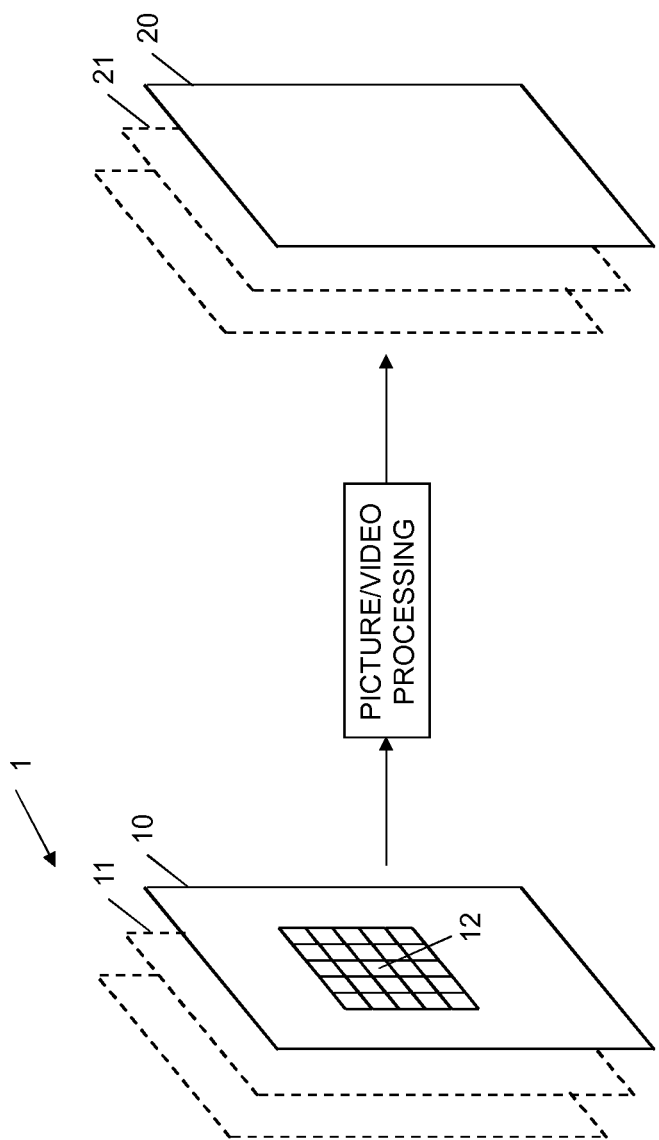
FIG. 1 schematically illustrates processing of pictures resulting in processed pictures.

Picture as used herein relates to still images or pictures and to pictures of video streams or sequences, sometimes also referred to as video frames or simply frames. FIG. 1 schematically illustrates the concept of processing pictures 10, 11 in some picture or video processing application to get processing results in the form of processed pictures 20, 21. Illustrative, but non-limiting, examples of such processing applications include various filtering or pre-filtering applications, compression or encoding applications, decompression or decoding applications, display applications, etc.

A picture 10 comprises pixels 12, also referred to as samples, having respective pixel values, also referred to as sample values. Various color spaces and formats are available and used to represent the colors of pixels 12 in pictures 10, including in pictures 10 of a video sequence 1. Non-limiting, but illustrative, examples of such color spaces or formats include red (R), green (G), blue (B) color, i.e., RGB color; luma (Y') and chroma (Cb, Cr) color, i.e., Y'CbCr color; luminance (Y) and chrominance (X, Z) color, i.e., XYZ color; luma or intensity (I) and chroma (Ct, Cp) color, i.e., ICtCp color. In such a case, a pixel value as used herein could be any color component value, such as R, G, B, Y', Cb, Cr, X, Y, Z, I, Ct or Cp value. In a particular embodiment, a pixel value is a luma value (Y') or a chroma value (Cb or Cr).

Figure 2:
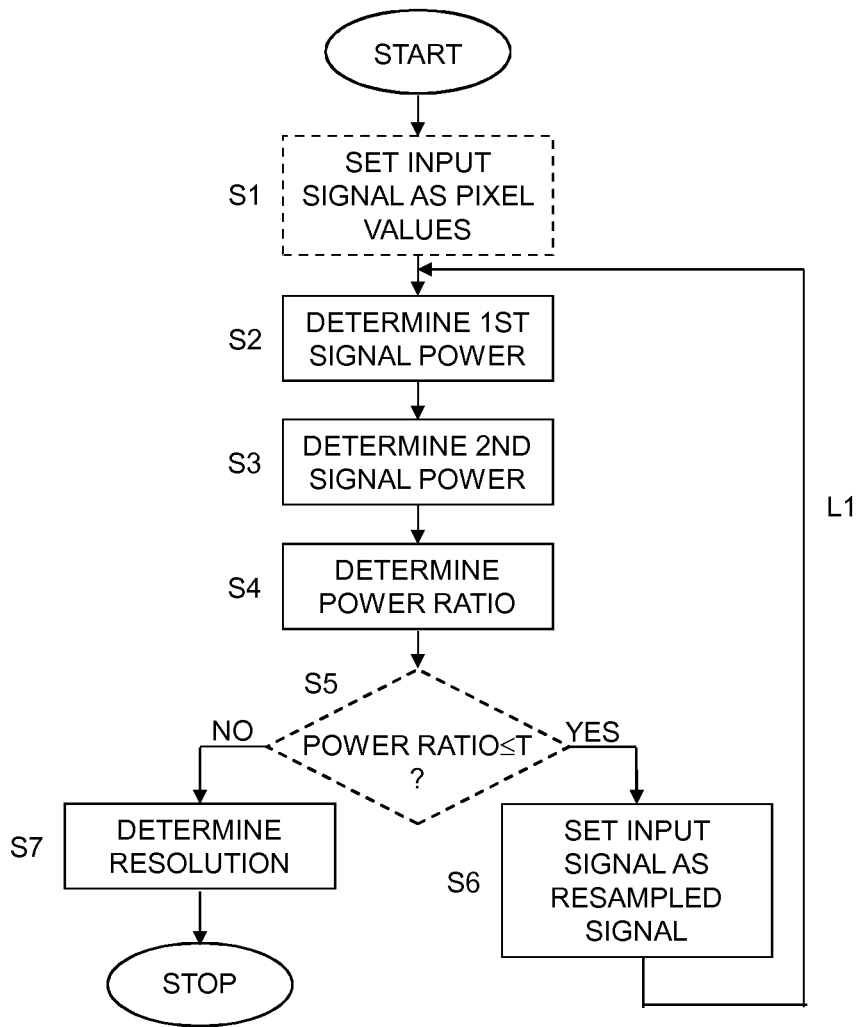
FIG. 2 is a flow chart illustrating a method of determining a resolution according to an embodiment.

FIG. 2 is a flow chart illustrating a method of determining a resolution for a picture 10, see also FIG. 1. The method comprises performing steps S2 to S4 and S6 until a power ratio exceeds a threshold value, which is schematically illustrated by the line L1 in FIG. 2. In this method, an input signal is initially set as pixel values of the picture 10. Step S2 in FIG. 2 comprises determining a first signal power of a first residual signal representative of a difference between the input signal and a half-band filtered version of the input signal. Step S3 correspondingly comprises determining a second signal power of a second residual signal representative of a difference between a resampled signal and a half-band filtered version of the resampled signal. The resampled signal is a downsampled version of the half-band filtered version of the input signal. Steps S2 and S3 in FIG. 2 can be performed serially in any order, i.e., step S2 prior to step S3 or step S3 prior to step S2. Alternatively, the two steps S2 and S3 can be performed at least partly in parallel.

A next step S4 comprises determining a power ratio based on the first signal power and the second signal power. The input signal is then set equal to the resampled signal in step S6 if the power ratio is equal to or below the threshold value. The method also comprises determining, in step S7, the resolution for the picture based on a resolution of the set input signal when the power ratio exceeds the threshold value.

The method as shown in FIG. 2 thereby involves performing steps S2 to S4 and S6 until the power ratio as determined in step S4 exceeds the threshold value (T). The first round of the loop involving steps S2 to S4 uses the pixel values of the picture 10 as input signal to determine the first and second signal powers in steps S2 and S3. If the power ratio determined in step S4 is equal to or below the threshold value, such as checked, assessed or verified in the optional step S5, a second round of the loop involving steps S2 to S4 is performed. In this second round, the input signal is set equal to the resampled signal in step S6. This resampled signal is in turn a downsampled version of the half-band filtered version of the input signal from the first round of the loop, i.e., a downsampled version of the half-band filtered version of the pixel values of the picture 10. If the updated power ratio determined in step S4 in the second round of the loop is still equal to or below the threshold, a third round of the loop involving steps S2 to S4 is performed. In this third round, the input signal is set equal to the resampled signal from the second round of the loop in step S6. This loop involving steps S2 to S4 and S6 is thereby performed until the (updated) power ratio determined in step S4 exceeds the threshold value.

As long as the power ratio is equal to or below the threshold value there is typically not enough power in the first residual signal relative to the second residual signal. Accordingly, the input signal should be further downscaled at least once more and steps S2 to S4 are thereby repeated at least once more. However, once the power ratio exceeds the threshold value there is significant power in the first residual signal relative to the second residual signal. This means that the input signal is in a suitable resolution and no further downscaling, i.e., downsampling and half-band filtering operations are necessary.

The resolution for the picture 10 is determined in step S7 once the power ratio determined in step S4 exceeds the threshold value. In such a case, the resolution for the picture 10 is determined based on the resolution of the set input signal, i.e., based on the resolution of the latest version of the input signal from the latest round of the loop involving steps S2 to S4. The resampled signal is, as mentioned above, a downsampled version of the half-band filtered version of the input signal. Hence, the resolution for the picture 10 could also be determined based on the resolution of the resampled signal as that resolution is one level below the resolution of the input signal due to being a downsampled version of the input signal. Hence, determining the resolution of the picture 10 in step S7 based on the resolution of the resampled signal is basically equivalent to determining the resolution of the picture based on the resolution of the input signal.

Setting the input signal initially as pixel values of the picture 10 as mentioned herein implies that the samples of the input signal are set equal to the pixel values of the pixels 12 in the picture 10. For instance, the input signal could be defined as $s(x)$, wherein x denotes a coordinate of a pixel 12 in the picture 10. For instance, $s(1)$ represents the pixel value of the first pixel 12 in the picture 10, $s(2)$ represents the pixel value of the second pixel 12 in the picture 10, and so on. These coordinates could be considered as a 1D index of a raster scan order in the picture, such as from the top to the bottom and from left to the right. Alternatively, the coordinates could be a 2D vector containing both horizontal and vertical positions of the pixel 12, i.e., $s(X)=s(x,y)$.

In an embodiment, the method comprises an additional, optional step S1 as indicated in FIG. 2. This step S1 then comprises setting the input signal initially as pixel values of the picture 10.

In an embodiment, the method also comprises the previously mentioned and in FIG. 2 shown step S5. This step S5 comprises determining, verifying or checking whether the power ratio as determined in step S4 exceeds the threshold value, which is equivalent to determining, verifying or checking whether the power ratio is equal to or below the threshold value. If the power ratio exceeds the threshold value, and thereby is not equal to or below the threshold value, the method continues from step S5 to step S7. However, if the power ratio does not exceed the threshold value, i.e., is equal to or below the threshold value, the method instead continues to step S6.

In an embodiment, step S2 in FIG. 2 comprises determining the first signal power based on, such as equal to, a variance of the first residual signal and step S3 correspondingly comprises determining the second signal power based on, such as equal to, a variance of the second residual signal. This embodiment thereby comprises determining power of a signal based on, preferably equal to, the variance of the signal.

In a particular embodiment, step S2 in FIG. 2 comprises determining the first signal power $P_{r1}=\mathrm{var}(r_1(x))$ and step S3 comprises determining the second signal power $P_{r2}=\mathrm{var}(r_2(x))$. In this particular embodiment, $r_1(x)$ represents the first residual signal and $r_2(x)$ represents the second residual signal. $\mathrm{var}(r(x))$ is a function calculating the variance of a signal $r(x)$. In an embodiment, $$\mathrm{var}(r(x)) = \frac{1}{L}\sum_{x=1}^{L} r(x)^2$$

and L represents total number of pixels 12 or samples in $r(x)$.

Figure 13:
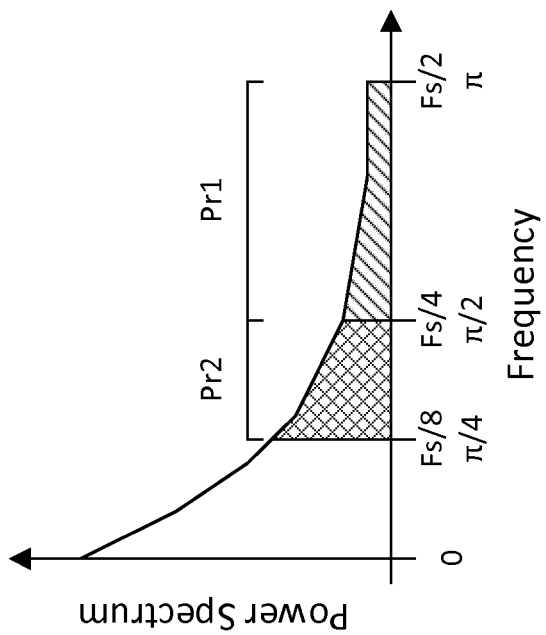
FIG. 13 is a diagram illustrating power spectrum of natural images along with residual power integration areas.

The embodiments are not limited to determining the signal powers by determining the variance of the residual signals. Also other examples of determining signal power could be used. For instance, a 2D integral could be determined in the frequency domain of each residual signal. Such an approach typically involve doing a 2D FFT on the picture 10, calculating squared magnitudes and summing the squared magnitudes in the respective frequency band. This is schematically shown in FIG. 13.

Figure 3:
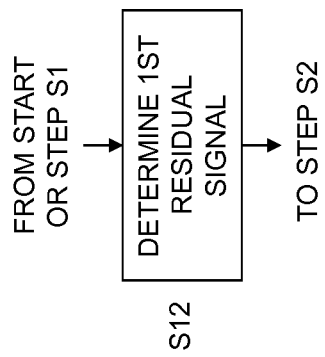
FIG. 3 is a flow chart illustrating an additional, optional step of the method in FIG. 2 according to an embodiment.

In an embodiment, the method comprises an additional, optional step as illustrated in FIG. 3. The method starts in this step S12 or continues from step S1 in FIG. 2. This step S12 comprises determining the first residual signal based on, such as equal to, a difference between the input signal and the half-band filtered version of the input signal. Hence, in an embodiment the first residual signal $r_1(x)=s(x)-s_1(x)$, wherein $r_1(x)$ represents the first residual signal, $s(x)$ represents the input signal and $s_1(x)$ represents the half-band filtered version of the input signal. In another embodiment, $r_1(x)=f(s(x)-s_1(x))$ where $f(r(x))$ is some function operating on the difference between the input signal and the half-band filtered version of the input signal. The method then continues to step S2 in FIG. 2, where the first signal power is determined.

Figure 4:
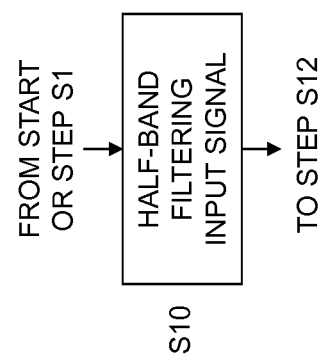
FIG. 4 is a flow chart illustrating an additional, optional step of the method in FIG. 3 according to an embodiment.

FIG. 4 is a flow chart illustrating an additional, optional step of the method shown in FIG. 3. The method starts in this step S10 or continues from step S1 in FIG. 2. This step S10 comprises half-band filtering the input signal to obtain the half-band filtered version of the input signal. Hence, in an embodiment $s_1(x)=\mathrm{filter}(s(x))$, wherein $\mathrm{filter}(r(x))$ represents the half-band filtering operation. The half-band filtering in step S10 could be performed according to various embodiment. Generally, a half-band filter is a low-pass filter that reduces the maximum bandwidth of a signal by an approximate factor of 2, i.e., one octave. For instance, the half-band filtering could use a low-pass anti-alias filter that is applied to the input signal. A low-pass finite impulse response (FIR) filter preferably having cut-off frequency of one-quarter of the sampling frequency $f_s$ and odd symmetry about $f_s/4$ could be used. Illustrative, but non-limiting, examples of such low-pass filters include a Lanczos filter as described in [1] and a Goodman-Carey filter as described in [2]. The method then continues to step S12 in FIG. 3, where the first residual signal is determined.

Figure 5:
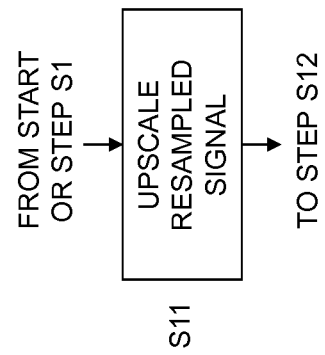
FIG. 5 is a flow chart illustrating an additional, optional step of the method in FIG. 3 according to another embodiment.

In an embodiment, only the initial input signal, i.e., the picture 10, is available when performing the determination of the resolution for the picture 10. In such a case, the half-band filtered version of the input signal and the resampled signal are preferably determined in order to determine the first and second signal power. In other embodiments, a resolution pyramid of at least two different resolutions of the picture 10 could be available. A picture resolution pyramid is a data set comprising the picture 10 in various resolutions, such as full resolution, half resolution, quarter resolution, etc. Such picture resolution pyramid may then be created by an external process and can be reused in the determination of the resolution. This means that the resampled signal is already available, in addition to the initial input signal, i.e., the picture 10, which relaxes the need for determining the resampled signal. In such an embodiment, the method preferably comprises the additional step S11 as shown in FIG. 5. This step S11 comprises upscaling the resampled signal to obtain the half-band filtered version of the input signal. The method then continues to step S12 in FIG. 3, where the first residual signal is determined.

Upscaling the resampled signal in step S11 preferably comprises upsampling and half-band filtering the resampled signal to obtain the half-band filtered version of the input signal. In a particular embodiment, the upscaling in step S11 comprises upsampling the resampled signal with a factor of 2 to get an upsampled resampled signal and then half-band filtering the upsampled resampled signal to obtain the half-band filtered version of the input signal.

Upsampling a signal can be performed according to various embodiments. For instance, upsampling a signal with a factor of M involves increasing the number of samples in the signal with a factor of M and typically filling the gaps between the original samples with zeros. Such a filling with zeros in between the original samples will introduce repetition of spectrum that is removed by the half-band filtering that is performed after upsampling. The upscaling may, alternatively, be performed according to other types of implementations, such as polyphase filtering.

Hence, FIGS. 4 and 5 illustrate two different embodiments that could be used to obtain the half-band filtered version of the input signal. In FIG. 4, the half-band filtered version of the input signal is obtained by half-band filtering the input signal, whereas in FIG. 5, the half-band filtered version of the input signal is obtained by upscaling the resampled signal. The former embodiment in FIG. 4 is in particular applicable to the case when only the initial input signal, i.e., the picture 10, is available, whereas the latter embodiment in FIG. 5 may be used when both the input and resampled signals are available, such as forming part of an externally created picture resolution pyramid.

FIG. 6 is a flow chart illustrating additional, optional steps of the method shown in FIG. 2. In an embodiment, the method comprises the additional step S22, which comprises determining the second residual signal based on a difference between the resampled signal and the half-band filtered version of the resampled signal. This step S22 could be performed prior to, following, or at least substantially in parallel with step S2 in FIG. 2. Hence, in an embodiment the second residual signal $r_2(x)=s_r(x)-s_2(x)$, wherein $r_2(x)$ represents the second residual signal, $s_r(x)$ represents the resampled signal and $s_2(x)$ represents the half-band filtered version of the resampled signal. In another embodiment, $r_2(x)=g(s_r(x)-s_2(x))$ where $g(r(x))$ is some function operating on difference between the resampled signal and the half-band filtered version of the resampled signal. This function $g(r(x))$ could be the same function or a different function as compared to the function $f(r(x))$. The method then continues to step S3 in FIG. 2, where the second signal power is determined.

In an embodiment, the method also comprises the optional step S20 as shown in FIG. 6. This step S20 comprises downsampling the half-band filtered version of the input signal to obtain the resampled signal. Hence, in an embodiment $s_r(x)=down(s_1(x))$, wherein $down(r(x))$ represents the downsampling operation. Generally, downsampling a signal by a factor M implies that only every $M^{th}$ sample in the signal is kept. In an embodiment, the downsampling in step S20 is preferably a downsampling by a factor 2, which means that every other sample of the half-band filtered version of the input signal is kept to obtain the resampled signal.

In digital signal processing, decimation is the process of reducing the sampling rate of a signal. When decimation is performed on a sequence of samples of a signal, it produces an approximation of the sequence that would have been obtained by sampling the signal at a lower rate. Decimation is generally a two-step process involving reduction of high-frequency signal components with a low-pass filter, such as a half-band filter, and downsampling the filtered signal by a factor M.

Hence, in an embodiment the input signal is subject to such a decimation process since it is preferably both half-band filtered in step S10 in FIG. 4 and the half-band filtered version of the input signal is then downsampled in step S20 in FIG. 6 to produce the resampled signal. Hence, the resampled signal could be regarded as a decimated or downscaled version of the input signal.

FIG. 6 also illustrates another optional step of the method. This optional step S21 comprises half-band filtering the resampled signal to obtain the half-band filtered version of the resampled signal. Hence, in an embodiment $s_2(x)=\text{filter}(s_r(x))$. This step S21 is preferably performed as previously described in connection with step S10 in FIG. 4. The method then continues to step S22 in FIG. 6, where the second residual signal is determined.

In an embodiment, step S4 of FIG. 2 comprises determining the power ratio based on, such as equal to, a ratio between the first signal power and the second signal power. Hence, in an embodiment $$\gamma = \frac{P_{r1}}{P_{r2}},$$

wherein $\gamma$ represent the power ratio. In another embodiment $$\gamma = h\left(\frac{P_{r1}}{P_{r2}}\right)$$

for some function $h(x)$.

Consider a 1D power spectrum of a natural picture:

$$s(\omega) = \frac{P_0}{(\omega + \alpha)^2} \quad (1)$$

where $P_0$ is signal power, $\omega$ is 1D spatial frequency, and $\alpha$ is small positive constant introduced to avoid singularities at $\omega=0$. By integrating the above expression up to some maximum frequency $\Omega$, a band-limited signal power becomes:

$$P_B(\Omega) = \int_0^\Omega S(\omega)d\omega = \frac{P_0 \Omega}{\alpha(\omega + \alpha)} \quad (2)$$

Consider a perfect half-band filter, i.e., passing-through all frequencies up to the half of the maximum signal frequency and removing the rest, on the signal above. This is a prerequisite for any alias-free resizing operation, so will be done just before the resampling stage, e.g., resolution reduction.

Because the filter was assumed ideal, the filtered signal will have an identical spectrum up to $\Omega/2$ and then be null up to $\Omega$. Subtracting such a signal from the original signal, produces a residual band-pass signal with the power expressed by:

$$P_{r1} = P_B(\Omega) - P_B\left(\frac{\Omega}{2}\right) = \frac{P_0\Omega}{(\Omega + \alpha)(\Omega + 2\alpha)} \quad (3)$$

After this half-band anti-alias filtering, a resampling process will result in a signal where maximum frequency is half of the original frequency. If the half-band filtering operation is performed a second time, and the result is subtracted from the corresponding input, the resulting power of this second residual band-pass signal will be given by:

$$P_{r2} = P_B\left(\frac{\Omega}{2}\right) - P_B\left(\frac{\Omega}{4}\right) = \frac{2P_0\Omega}{(\Omega + 4\alpha)(\Omega + 2\alpha)} \quad (4)$$

The above two powers can be estimated in the spatial domain using correspondingly variance of the first residual between the original signal s(x) and the half-band filtered signal $s_1(x)$, and variance of the second residual between rescaled, i.e., half-band filtering followed by resampling signal $s_r(x)$ and the second-time half-band filtered signal $s_2(x)$ with frequency content reduced 4 times relative to the original signal:

$$P_{r1} = \text{var}\{s(x) - s_1(x)\}, \ P_{r2} = \text{var}\{s_r(x) - s_2(x)\} \quad (5)$$

where variance of the residual discrete signal r(x) composed of L samples is expressed by:

$$\text{var}\{r(x)\} = \frac{1}{L}\sum_{x=1}^{L} r(x)^2 \quad (6)$$

Calculating the ratio between powers in (3) and (4) leads to:

$$\gamma = \frac{P_{r1}}{P_{r2}} = \frac{\Omega + 4\alpha}{2(\Omega + \alpha)} \quad (7)$$

Assuming that $\alpha \ll \Omega$, and denoting $$\eta = \frac{\alpha}{\Omega},$$

the above ratio can be expressed as:

$$\gamma = \frac{4\eta + 1}{2(\eta + 1)} \quad (8)$$

which, in the limit $\eta \to 0$, becomes:

$$\gamma_{\eta \to 0} = \lim_{\eta \to 0}\left(\frac{4\eta + 1}{2(\eta + 1)}\right) = \frac{1}{2} \quad (9)$$

The above equation means that the ratio between variances of two residual signals is invariant to the original signal power and is a constant quantity.

The above derivation was inferred for one particular form of the power spectrum of natural pictures and without explicit consideration for sampling effects. To demonstrate similar invariance explicitly for sampled signals that holds also for other functional forms of power spectra, consider a class of exponential 1D autocorrelation functions of natural pictures:

$$c(x) = P_0 e^{-|x|/D} \quad (10)$$

where $P_0$ is, as before, signal power and D is the correlation length. Its corresponding, circular power spectrum for sampled signals, can be expressed as:

$$S(\omega; D) = P_0 \frac{\sinh\left(\frac{1}{D}\right)}{\cosh\left(\frac{1}{D}\right) - \cos(\omega)} \quad (11)$$

and is periodic with a period of $2\pi$, so the Nyquist frequency, i.e., half the sampling frequency, is $\pi$.

Following derivations in (3) and (4), the power of the first residual signal between the original signal and the half-band filtered signal is:

$$P_{r1}(D) = \int_{\frac{\pi}{2}}^{\pi} S(\omega; D) d\omega = P_0\left(\pi - 2\tan^{-1}\left(\coth\left(\frac{1}{2D}\right)\right)\right) \quad (12)$$

and the power of the second residual (second time filtering) is:

$$P_{r2}(D) = \int_{\frac{\pi}{4}}^{\frac{\pi}{2}} S(\omega; D) d\omega = 2P_0\left(\tan^{-1}\left(\coth\left(\frac{1}{2D}\right)\right) - \tan^{-1}\left(\coth\left(\frac{1}{2D}\right)\tan\left(\frac{\pi}{8}\right)\right)\right) \quad (13)$$

Calculating the ratio between powers in (12) and (13) leads to:

$$\gamma(D) = \frac{P_{r1}(D)}{P_{r2}(D)} = \frac{\pi - 2\tan^{-1}\left(\coth\left(\frac{1}{2D}\right)\right)}{2\left(\tan^{-1}\left(\coth\left(\frac{1}{2D}\right)\right) - \tan^{-1}\left(\coth\left(\frac{1}{2D}\right)\tan\left(\frac{\pi}{8}\right)\right)\right)} \quad (14)$$

As before, the ratio between variances of two residual signals is invariant to the original signal power and is almost independent of the correlation structure of the original signal, e.g.:

$$\gamma(10) \approx 0.711944, \ \gamma(100) \approx 0.707155, \ \lim_{D \to \infty}(\gamma(D)) = \frac{1}{\sqrt{2}} \approx 0.707107 \quad (15)$$

The above relation holds when the original signal has the power spectrum expressed by (11) from 0 up to the Nyquist frequency $\pi$, or rephrasing, when the signal is in its original, native resolution, i.e., the resolution.

Consider another signal that originally occupied half the original bandwidth (up to $\pi/2$) and was subsequently upscaled (up to $\pi$). In such a case, its native resolution is still half the original bandwidth and the detection algorithm should reflect this.

Using the ratio proposed in (14) and knowing that in such a case the power of the first residual signal $P_{r1}(D)=0$, the proposed power ratio drops to $\gamma(D)=0$. This also holds for any signal with frequency content below $\pi/2$, i.e., below half the Nyquist frequency.

Figure 12:
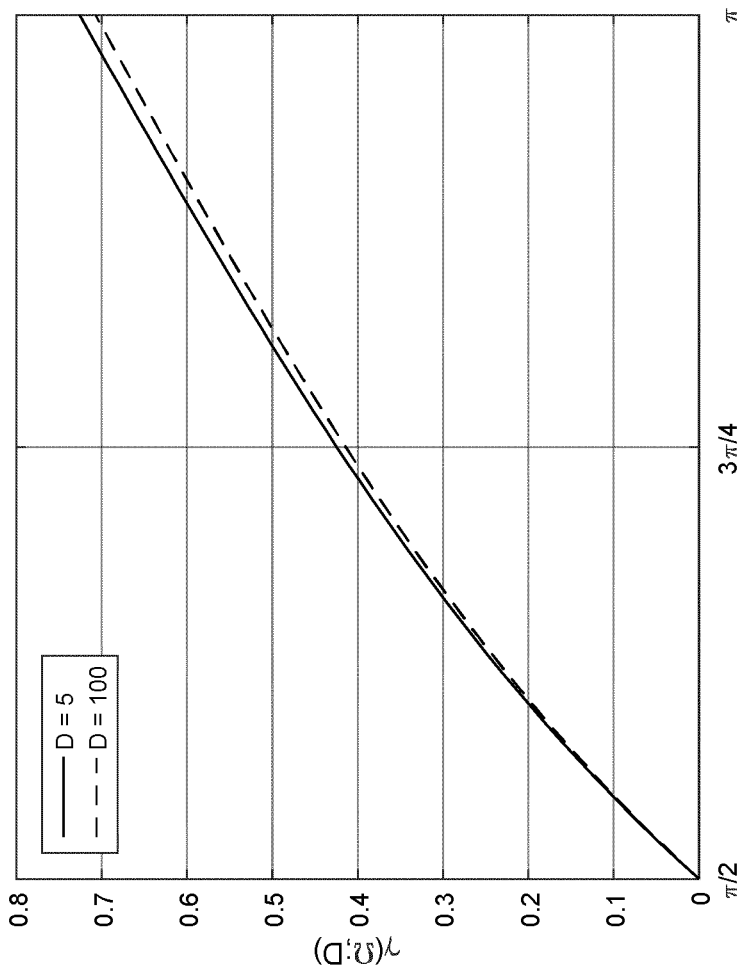
FIG. 12 is a diagram illustrating power ratio as a function of maximum spatial frequency in a signal for two correlation lengths.

Finally, for any signal with maximum frequency $\Omega$ in between $\pi/2$ and $\pi$, e.g., when the upscaling factor is not a power of 2, the power of the first residual signal becomes:

$$P_{r1}^{\Omega}(D) = \int_{\frac{\pi}{2}}^{\Omega} S(\omega; D) d\omega = 2P_0 \left( \tan^{-1}\left( \coth\left(\frac{1}{2D}\right) \tan\left(\frac{\Omega}{2}\right) \right) - \tan^{-1}\left( \coth\left(\frac{1}{2D}\right) \right) \right) \quad (16)$$

and correspondingly, the power ratio can now be expressed by:

$$\gamma(\Omega; D) = \frac{P_{r1}^{\Omega}(D)}{P_{r2}(D)} = \frac{\tan^{-1}\left(\coth\left(\frac{1}{2D}\right)\tan\left(\frac{\Omega}{2}\right)\right) - \tan^{-1}\left(\coth\left(\frac{1}{2D}\right)\right)}{\tan^{-1}\left(\coth\left(\frac{1}{2D}\right)\right) - \tan^{-1}\left(\coth\left(\frac{1}{2D}\right)\tan\left(\frac{\pi}{8}\right)\right)} \quad (17)$$

and is shown for two correlations lengths D in FIG. 12. As can be seen in FIG. 12, the power ratio, as previously, is quasi-independent of the correlation structure of the input signal and is limited from below by $\gamma(D)=0$ and from above by $\gamma(D)\approx 0.7$ as in equations (14) and (15).

In the following implementation example, a signal denotes a picture 10, such as a still image or a video frame, and x denotes spatial coordinates of a pixel 12 in this picture 10. These coordinates can be considered as a 1D index of a raster scanned picture 10, e.g., from top to bottom and from left to right, or as a 2D vector containing horizontal and vertical positions of the considered pixel 12. All filtering operations assume 2D topology, i.e., 2D lattice of pixels 12.

The implementation example starts with the original signal, i.e., the picture 10, s(x), and performs half-band filtering on it, which results in the signal $s_1(x)$. Both of these signals have the same dimensions and their difference, i.e., the first residual signal $r_1(x)$, is expressed by:

$$r_1(x) = s(x) - s_1(x) \quad (18)$$

The half-band filtered signal $s_1(x)$ is subsequently downsampled, e.g., by selecting every other sample from the signal $s_1(x)$, to half the original resolution to obtain the resampled signal $s_r(x)$. Repeating the above half-band filtering process on the resampled signal will result in signal $s_2(x)$ where spectral content will be limited to a quarter of the original resolution. Similarly, second residual signal $r_2(x)$ can be created as:

$$r_2(x) = s_r(x) - s_2(x) \quad (19)$$

In the scenario where an external resolution pyramid of at least two resolutions can be used and the downsampled signal $s_r(x)$ is already available, this signal $s_r(x)$ can be upscaled, i.e., upsampled and half-band filtered, to $s_1(x)$ to match the resolution of the original s(x) to allow calculations of the first residual signal using (18).

Once both residual signals are calculated, their powers $P_{r1}$ and $P_{r2}$ are estimated by calculating their discrete variances as:

$$P_{r1} = \text{var}\{r_1(x)\}, \; P_{r2} = \text{var}\{r_2(x)\}, \; \text{var}\{r(x)\} = \frac{1}{L}\sum_{x=1}^{L} r(x)^2 \quad (20)$$

where L denotes the total number of samples in the signal, e.g., the number of pixels 12 in picture 10. These powers are subsequently used to construct the power ratio $\gamma$:

$$\gamma = \frac{P_{r1}}{P_{r2}} \quad (21)$$

The power ratio has properties and behavior described in the foregoing.

A sketch of the power spectrum of natural pictures along with the distinctive frequencies used in this example and the corresponding residual power integration areas are shown in FIG. 13.

Finally, the power ratio calculated in (21) is tested against a threshold T so the final decision can be described as follows:

$\gamma > T$, there is significant power in the first residual signal relative to the second residual signal, so the input signal is already in its resolution and no further operations are necessary;

$\gamma \leq T$, there is not enough power in the first residual signal relative to the second residual signal, so preferably, the signal should be downsampled at least once more and the above procedure repeated.

The above evaluation was performed on video frames from widely known video databases: VMAF—Video Multimethod Assessment Fusion [3], VQEG—Video Quality Experts Group [4] and MCL-V video database [5]. The results were evaluated in terms of success rates, i.e., how many times over all trials the algorithm made the correct decision, and the results were maximized with a success rate of 99.58% for the threshold value T=0.112. It should, though, be noted that the this threshold value is not definitive and can be adjusted to optimize the algorithm for other than natural content types and/or with power spectra other than those described by (1) and (11).

The present invention thereby allows determination of the resolution for a picture 10. In an embodiment, the invention also comprises determining a resampling level for the picture 10 based on the resolution as illustrated in step S8 in FIG. 7. In such a case, the resolution as determined in step S7 in FIG. 2 is used in step S8 to determine the resampling level for the picture 10. The resampling level is typically a value indicating required downsampling or downscaling level for the input signal to be in its resolution. For instance, a value of 8 could indicate that the input signal needs to be 3 times downsampled, i.e., $8=2^3$.

The method as shown in FIG. 2 produces the input signal in the resolution at the round of the loop involving steps S2 to S4 when the power ratio exceeds the threshold value. This means that at step S7 in FIG. 2 the input signal in the resolution is available. This input signal in the resolution is thereby a resampled version of the picture 10 at a resolution corresponding to the optimal resolution for processing the picture 10. This resampled version of the picture 10 can then be output as shown in step S9 in FIG. 8. The resampled version of the picture 10 is thereby preferably output to a downstream processing application for usage therein. The output resampled version of the picture 10 is then at a picture resolution that is adapted for, preferably optimized for, the processing application.

The method as shown in FIG. 2 and further embodiments as illustrated in FIGS. 3 to 8 could operate on a single type of pixel value, such intensity channel containing luma (Y'), luminance (Y) or intensity (I) values as pixel values. This is preferred if the picture 10 is a monochromatic picture. However, this approach can also be used in the case of color pictures in order to reduce the processing operations or calculations. Alternatively, for color pictures, the method can be performed on all three color channels, such as the intensity channel (Y', Y or I) and chromatic channels, i.e., chroma values (Cb, Cr) or chromaticity values (X, Z). Various forms of aggregations of the results of the different channels are possible as is further described here below with reference to pictures 10, 11 of a video sequence 1.

In the following described embodiments, the picture 10 is thereby a picture 10 or frame of a video sequence 1.

In these embodiment, steps S2 to S4 and S6 in FIG. 2 are performed for each picture 10 among multiple pictures 10, 11 of the video sequence 1 until a power ratio exceeds a threshold value. In these embodiment, the input signal is initially set as pixel values of the picture 10.

In an embodiment, step S2 comprises determining a first signal power of a first residual signal representative of a difference between the input signal and a half-band filtered version of the input signal. Step S3 comprises determining a second signal power of a second residual signal representative of a difference between a resampled signal and a half-band filtered version of the resampled signal. The resampled signal is a downsampled version of the half-band filtered version of the input signal. Step S4 comprises determining the power ratio based on the first signal power and the second signal power. Step S6 comprises setting the input signal equal to the resampled signal if the power ratio is equal to or below the threshold value. In this embodiment, step S7 comprises determining a respective resolution for each picture 10 among the multiple pictures 10, 11 based on a resolution of the set input signal when the power ratio determined for the picture exceeds the threshold value.

The determination of resolution according to this embodiment is thereby made independently for each picture 10, 11 in the video sequence 1 and any rescaling of one picture 10 is independent of any rescaling of another picture 11 in the video sequence 1. This embodiment provides the finest granularity and flexibility to adapt to varying content and/or view conditions.

The independent determination of resolutions for pictures 10, 11 in a video sequence 1 could also be applied to independent determination of resolutions for different color channels in a single picture 10. As a consequence, a result of such an approach could be determining the same resolution for all three color channels, different resolutions for the three color channel or one resolution for one color channel and another same resolution for two of the color channels.

In another embodiment, step S2 comprises determining a first signal power of a first residual signal representative of a difference between the input signal and a half-band filtered version of the input signal. Step S3 comprises determining a second signal power of a second residual signal representative of a difference between a resampled signal and a half-band filtered version of the resampled signal. The resampled signal is a downsampled version of the half-band filtered version of the input signal. Step S4 comprises determining the power ratio based on the first signal powers determined for the multiple pictures 10, 11 and the second signal powers determined for the multiple pictures 10, 11. Step S6 comprises setting the input signal equal to the resampled signal if the power ratio is equal to or below the threshold value. Then, step S7 comprises determining the resolution based on a resolution of the set input signal when the power ratio exceeds the threshold value.

In this embodiment, the power ratio is determined based on respective first and second signal powers determined for multiple pictures 10, 11 in the video sequence 1. For instance, the determination of the power ratio in step S4 could be performed based on signal powers determined for all pictures 10, 11 in the video sequence 1, for all pictures 10, 11 in a selected analysis interval or time window of the video sequence 1 or for all pictures 10, 11 in a moving analysis interval or time window of the video sequence 1 as illustrative, but non-limiting, examples.

For instance, step S4 could comprise determining the power ratio based on an average of the first signal powers determined for the multiple pictures 10, 11 and an average of the second signal powers determined for the multiple pictures 10, 11, e.g., $$\gamma = \frac{\sum_{i=1}^{N} P_{r1,i}}{\sum_{i=1}^{N} P_{r2,i}}$$

and N represents the total number of pictures 10, 11 to be averaged. Another example would be to determine the power ratio based on a median of the first signal powers determined for the multiple pictures 10, 11 and a median of the second signal powers determined for the multiple pictures 10, 11.

This embodiment may average variances or power of the residual signals over some period of time or the entire video duration and then calculate the power ratio using the averaged variances or powers and determine the resolution based on the calculated power ratio. In this embodiment, a single resolution is thereby determined for the pictures 10, 11 in this analysis interval or indeed the entire video sequence 1. This approach is on average robust for ergodic signals, i.e., when ensemble statistics can be averaged over time.

In a further embodiment, step S2 comprises determining a first signal power of a first residual signal representative of a difference between the input signal and a half-band filtered version of the input signal. Step S3 comprises determining a second signal power of a second residual signal representative of a difference between a resampled signal and a half-band filtered version of the resampled signal. The resampled signal is a downsampled version of the half-band filtered version of the input signal. Step S4 comprises determining the power ratio based on the first signal power and the second signal power. Step S6 comprises setting the input signal equal to the resampled signal if the power ratio is equal to or below the threshold value. Step S7 comprises, in this embodiment, determining the resolution based on a respective resolution of the set input signals when the respective power ratios determined for the multiple pictures 10, 11 exceeds the threshold value.

Hence, in this embodiment, the determination of the resolution is based on multiple resolutions of the set input signal signals for the multiple pictures 10, 11. For instance, these respective resolutions can be aggregated over some period of time or the entire video duration. The final determination of the resolution can then be made based on all of these respective resolutions. For instance, the resolution could be based on percentiles, e.g., if 99% of all respective resolutions of the set input signals when the respective power ratios determined for the multiple pictures 10, 11 exceeds the threshold value indicate a lower resolution than the original resolution of the pictures 10, 11 in the video sequence 1 then such a lower resolution should be used as resolution. In a related example, if at least X % of all respective resolutions of the set input signals when the respective power ratios determined for the multiple pictures 10, 11 exceeds the threshold value indicate a same resolution then this resolution will be used for all pictures 10, 11 of the video sequence 1 or for all pictures 10, 11 within the analysis interval. The value X could for instance be 90, 95 or 99 as illustrative, but non-limiting, examples.

In another example, the final decision of the resolution is made based on outliers. For instance, even if only one picture 10 in the video sequence 1 or the analysis interval indicate that the current resolution of that picture 10 should be preserved, i.e., the power ratio exceeded the threshold value in the first round of the loop of steps S2 to S4, then the resolution should be the original resolution of the pictures 10, 11 in the video sequence 1 or in the analysis interval.

The above presented embodiments of analyzing multiple pictures 10, 11 in a video sequence 1 and/or analyzing multiple color channels in one or multiple pictures 10, 11 are not mutually exclusive and can therefore be combined. For instance, one of the embodiments could be selected for analysis in short analysis intervals, e.g., 1 second, but another embodiment will be used in parallel on longer analysis intervals or indeed a complete video sequence 1.

Figure 11:
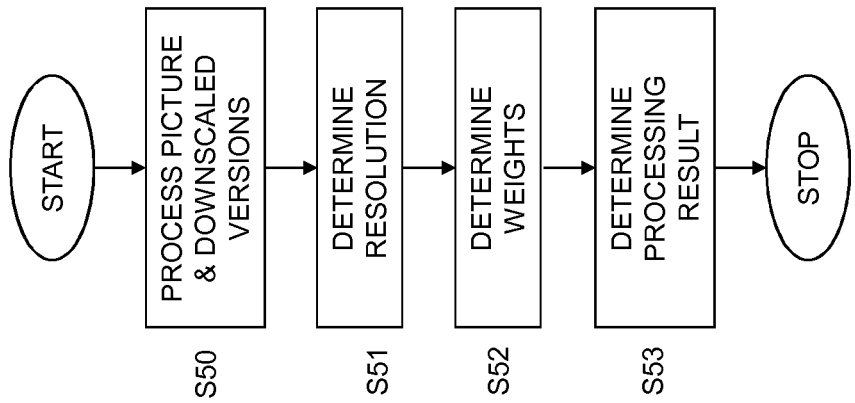
FIG. 11 is a flow chart illustrating a method of processing a picture according to a further embodiment.
Figure 10:
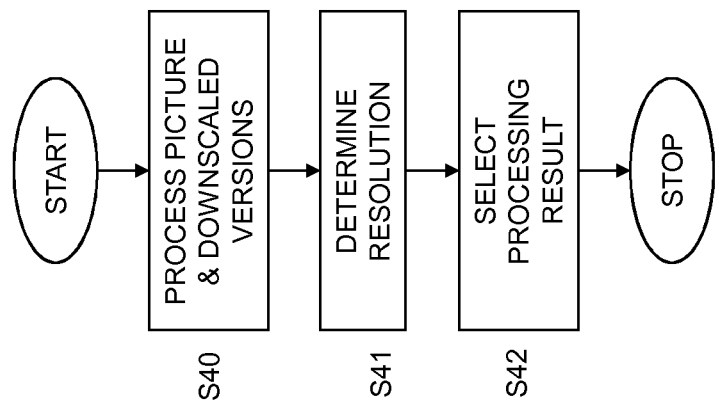
FIG. 10 is a flow chart illustrating a method of processing a picture according to another embodiment.
Figure 9:
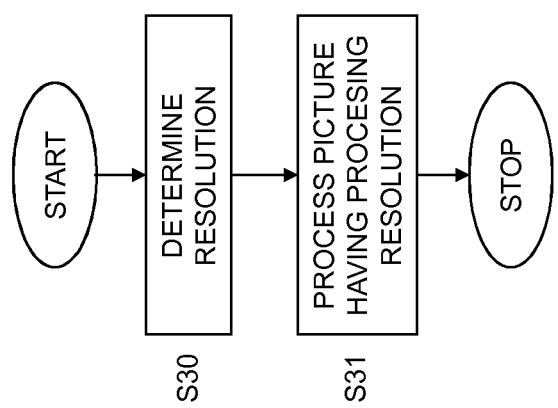
FIG. 9 is a flow chart illustrating a method of processing a picture according to an embodiment.

FIGS. 9 to 11 are flow charts illustrating different embodiments of a method of processing a picture 10. These embodiments use the resolution determined as previously described herein.

The embodiment shown in FIG. 9 comprises determining, in step S30, a resolution for the picture 10 according to any one of the embodiments described herein, such as with reference to FIG. 2 and optionally any of FIGS. 3 to 8. A next step S31 comprises processing a version of the picture 10 having a resolution corresponding to the resolution to obtain a processing result 20. The version of the picture 10 processed in step S31 could be the resampled picture as output in step S9 of FIG. 8. Hence, in this embodiment, the version of the picture 10 input into the processing application has a resolution equal to the resolution as determined in step S30.

The processing performed in step S31 of FIG. 9 and also in step S40 in FIG. 10 and step S50 in FIG. 11 can be any picture or video processing. The processing result 20 obtained in these steps S31, S40 and S50 depend on the type of processing performed in these steps. For instance, if the processing is in the form of a filtering operation applied to picture 10, the processing result 20 is a filtered picture. Correspondingly, if the processing is a compression or encoding operation, the processing result 20 is a compressed or encoded picture.

FIG. 10 illustrates another embodiment of a method of processing a picture 10. In this embodiment, step S40 comprises processing the picture 10 and at least one downscaled version of the picture 10 to obtain a respective processing result 20. A next step S41 comprises determining a resolution for the picture 10 according to any one of the embodiments described herein, such as with reference to FIG. 2 and optionally any of FIGS. 3 to 8. The following step S42 comprises selecting a processing result 20 among the respective processing results 20 based on the resolution.

This embodiment thereby differs from the one in FIG. 9 in that the picture 10 is already available at different resolutions by having access to not only the picture 10 but also at least one downscaled version of the picture 10. For instance, a picture resolution pyramid may be available as described in the foregoing. The differently scaled versions of the picture 10 could then be processed, such as in parallel, in step S40 to get a respective processing result 20. The particular processing result 20 to use is then selected in step S42 based the resolution determined for the picture 10 in step S41.

In a particular embodiment, step S42 comprises selecting the processing result 20 obtained by processing a version of the picture 10 having a resolution corresponding to the resolution determined in step S41. Thus, in this embodiment the version of the picture 10 having a resolution corresponding to, preferably equal to, the resolution determined in step S41 has the suitable or optimal resolution. This means that the processing result 20 obtained in step S40 for that version of the picture 10 should be selected and used as processing result in step S42.

FIG. 11 illustrates a further embodiment of a method of processing a picture 10. This embodiment comprises processing, in step S50, the picture 10 and at least one downscaled version of the picture 10 to obtain a respective processing result 20. This step S50 is preferably performed as described in connection with step S40 in FIG. 10. The following step S51 comprises determining a resolution for the picture 10 according to any one of the embodiments described herein, such as with reference to FIG. 2 and optionally any of FIGS. 3 to 8. In this embodiment, weights are determined in step S52 for the respective processing results 20 based on the resolution. Then, a processing result 20 is determined for the picture 10 in step S53 by weighting the respective processing results 20 with the determined weights.

In the embodiment shown in FIG. 10, a single processing result is selected based on the determined resolution and used as processing result 20 for the picture 10. The embodiment shown in FIG. 11 instead combines different processing results weighted by weights determined based on the resolution determined in step S51. Hence, the final processing result 20 determined in step S53 for the picture 10 will thereby be a weighted combination of some or all of the processing results obtained in step S50.

The weights could be determined in step S52 according to various embodiments. For instance, a weight for a processing result 20 obtained for a version of the picture 10 having a resolution corresponding to the resolution could be set higher than the weights for other processing results. As an example, assume that the resolution corresponds to a resampling level of 8, then the weight for processing result 20 obtained for a version of the picture 10 downsampled 3 times could be $\omega_8=0.625$, whereas the weights for the processing results one or two resampling levels up could be $\omega_4=0.250$ and $\omega_2=0.125$. In this example, the weight for the processing result 20 of the original picture 10, $\omega_0$, is zero. Another example could be to set the value of the weight at the resampling level corresponding to the resolution equal to 0.75 and then set weights at one resampling level below and one resampling level above this level equal to 0.125.

Alternatively, the values of the weights could be learned by performing some optimization process on the results, e.g., collecting quality scores for the processing results 20 resampling level corresponding to the resolution and for processing results 20 at one resampling level below and above this level and the using a least squares (LS) optimization to find weights that maximize the correlation between combined quality scores and quality scores assigned by human viewers.

The present invention is a fast and reliable technology of determining an optimal resolution for picture processing applications. The invention thereby determines a resolution at which most (or all) of the original picture content is contained. This means that processing the picture in this resolution will not have any detrimental effect on the processing result. The method is based on determining a robust, spatial domain, distinctive feature, i.e., the power ratio, to identify spectral composition of the signal along with the threshold-based decision rule to decide if the signal is in its optimal resolution or not. The method determines features, i.e., signal powers or variances, at original and, preferably, at half of the original picture resolution and combine them to obtain the power ratio, which is a unitless ratio that is very robust with respect to i) variations in spectral content and the method used to downsample picture and is invariant to the input signal power. This power ratio is subsequently used with a threshold-based decision rule to decide whether the input picture should be downsampled to a smaller resolution or not. This feature extraction and classification process is repeated recursively on progressively smaller pictures until the decision rule is met, which indicates that this resolution can be considered as suitable resolution.

The method is flexible and can be adapted to pictures with different spectral content, it allows different aggregation techniques to include all three color channels of pictures and/or merge decisions to rescale videos adaptively. It can use different operational modes and be applied in latency constrained or off-line, multi-pass processing environments. The method can use half-band filtering operations or can reuse existing resolutions pyramids. Most of the operations can be parallelized allowing fast, multi-threaded and vectorized implementation.

Figure 14:
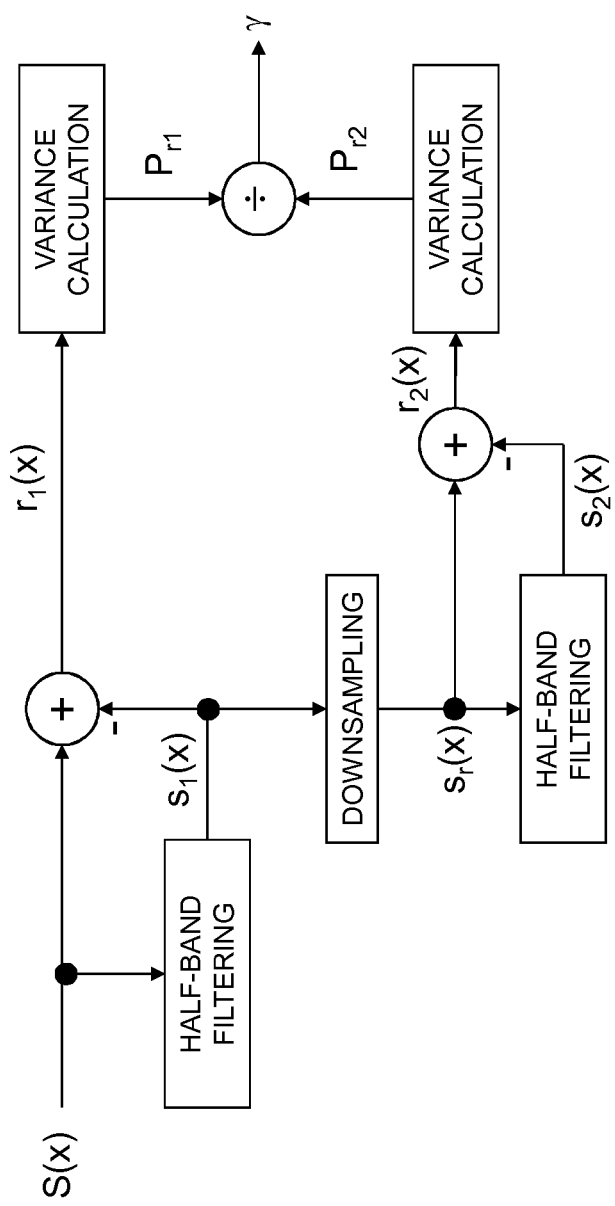
FIG. 14 schematically illustrates an embodiment of determining a power ratio.
Figure 15:
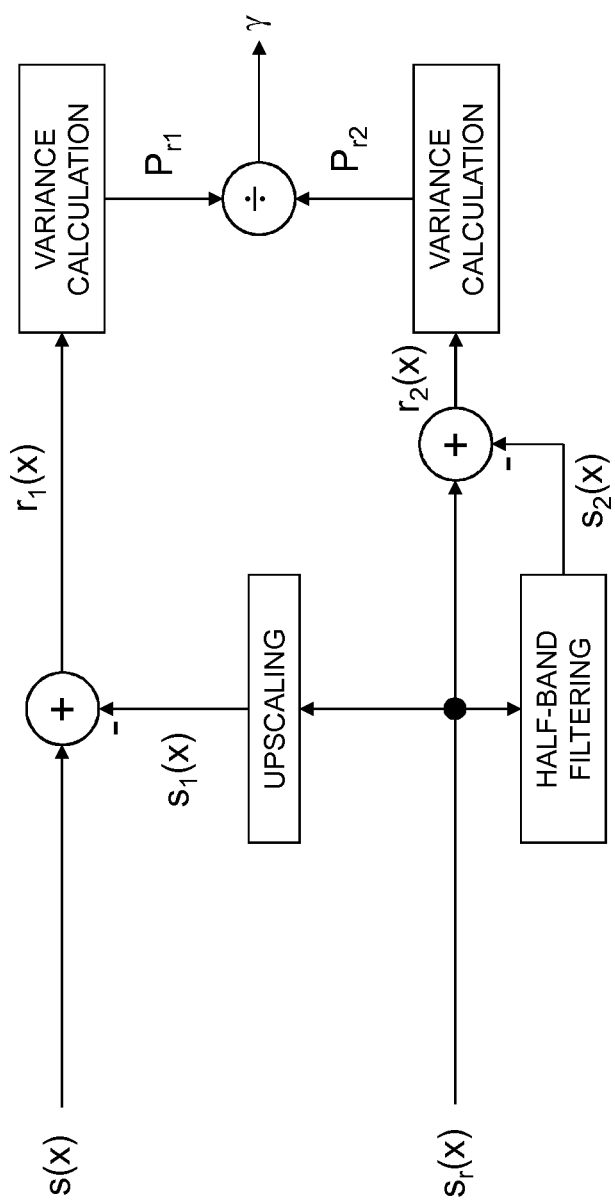
FIG. 15 schematically illustrates another embodiment of determining a power ratio.
Figure 16:
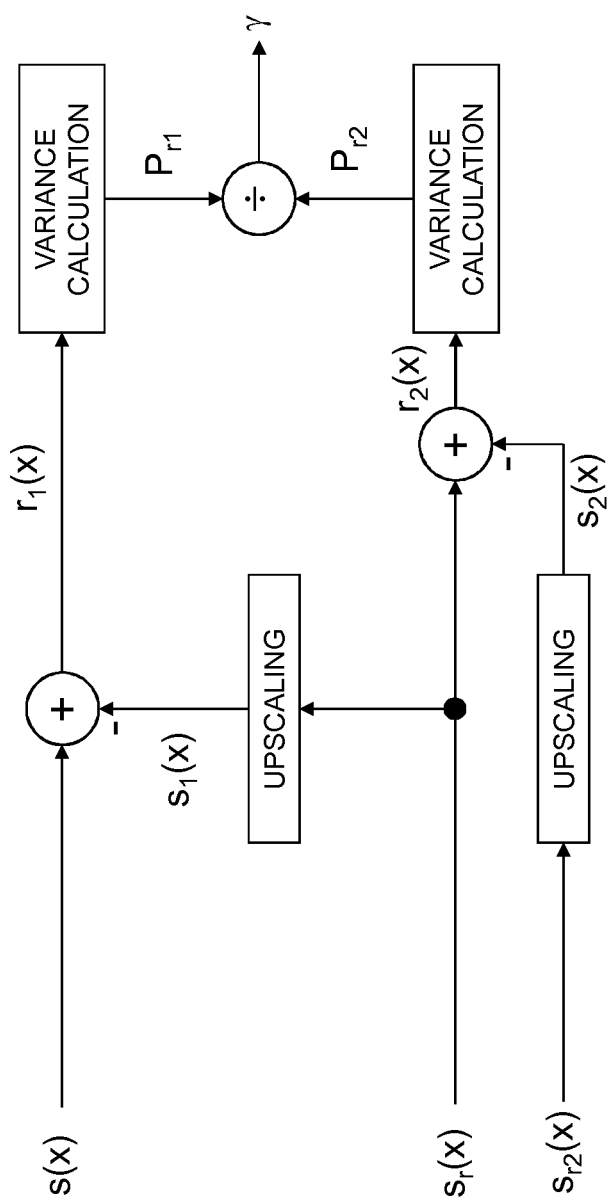
FIG. 16 schematically illustrates a further embodiment of determining a power ratio.

FIGS. 14 to 16 illustrate different embodiments of determining power ratios. In FIG. 14 only the picture 10 as original signal s(x) is available and input to the method resulting in the power ratio γ. In FIG. 15, a picture resolution pyramid is available so that not only the original signal s(x) but also at least one resampled signal $s_r(x)$ are available. The embodiments shown in FIGS. 14 and 15 correspond to the embodiments described in the foregoing in connection with FIGS. 4 and 5.

In some applications, dyadic progression may not be optimal from, for instance, computation resources point of view. In such a case, an arbitrary resolution pyramid may instead be determined and thereby available for usage when determining the resolution of the picture 10.

For instance, in the case of a set of resolutions for over-the-top (OTT) streaming, these resolutions are not necessarily in a dyadic progression and some resolutions may fall in between. In such a situation, residual signals may be determined between different resolution levels by upscaling form lower to higher resolution. Power ratio are then calculated and compared to threshold value. In an embodiment, there may be different threshold values for different levels in the arbitrary resolution pyramid instead of using just one threshold value.

FIG. 16 illustrates the determination of power ratios according to an embodiment having access to an arbitrary resolution pyramid exemplified by the original signal s(x), a first resampled signal $s_{r_1}(x)$ and a second resampled signal $s_{r_2}(x)$. These three signals of the resolution pyramid all have different resolutions with the resolution of the original signal being higher than the resolution of the first resampled signal, which in turn has a higher resolution than the second resampled signal.

In the embodiment shown in FIG. 16, the signal $s_1(x)$ is upscaled, such as by an arbitrary upscaling or resizing operation, from the first resampled signal $s_{r_1}(x)$. For instance, assume that the 2560×1440 is the top level in the hierarchy, i.e., the higher resolution in the arbitrary resolution pyramid. Hence, in this example it corresponds to the resolution of the original signal s(x). The next level down could then be 1920×1080, which in this case corresponds to the resolution of the first resampled signal $s_{r_1}(x)$. The first resampled signal will then be upscaled from 1920×1080 to 2560×1440 to be able to calculate the first residual signal $r_1(x)=s(x)-s_1(x)$. Similarly, the second resampled signal $s_{r_2}(x)$ is upscaled to the resolution level of the first resampled signal to calculate the second residual signal $r_2(x)=s_{r_1}(x)-s_2(x)$.

In this embodiment, the method of determining a resolution for a picture preferably comprises the following method steps. An input signal is initially set as pixel values of the picture 10. The following steps are performed until a power ratio exceeds a threshold value. Determining a first signal power of a first residual signal representative of a difference between the input signal and an upscaled version of a first resampled signal. Determining a second signal power of a second residual signal representative of a difference between the first resampled signal and an upscaled version of a second resampled signal. Determining the power ratio based on the first signal power and the second signal power. Setting the input signal equal to the resampled signal if the power ratio is equal to or below the threshold value. The method also comprises determining the resolution for the picture based on a resolution of the set input signal when the power ratio exceeds the threshold value.

This embodiment also relates to a device for determining a resolution for a picture. An input signal is initially set as an original signal of the picture and the device is configured to perform the following operations until a power ratio exceeds a threshold value. The device is configured to determine a first signal power of a first residual signal representative of a difference between the input signal and an upscaled version of a first resampled signal. The device is configured to determine a second signal power of a second residual signal representative of a difference between the first resampled signal and an upscaled version of a second resampled signal. The device is also configured to determine the power ratio based on the first signal power and the second signal power. The device is further configured to set the input signal equal to the resampled signal if the power ratio is equal to or below the threshold value. Once the power ratio exceeds the threshold value, the device is configured to determine the resolution for the picture based on a resolution of the set input signal when the power ratio exceeds the threshold value.

In the embodiments described above in connection with FIG. 16, the first and second resampled signals are different downscaled versions of the input signals.

Another aspect of the embodiments relates to a device for determining a resolution for a picture 10. An input signal is initially set as an original signal of the picture 10 and the device is configured to perform the following operations until a power ratio exceeds a threshold value. The device is configured to determine a first signal power of a first residual signal representative of a difference between the input signal and a half-band filtered version of the input signal. The device is configured to determined a second signal power of a second residual signal representative of a difference between a resampled signal and a half-band filtered version of the resampled signal. The resampled signal is a downsampled version of the half-band filtered version of the input signal. The device is also configured to determine the power ratio based on the first signal power and the second signal power. The device is further configured to set the input signal equal to the resampled signal if the power ratio is equal to or below the threshold value. Once the power ratio exceeds the threshold value, the device is configured to determine the resolution for the picture 10 based on a resolution of the set input signal when the power ratio exceeds the threshold value.

In an embodiment, the device is configured to set the input signal initially as the pixel values of the picture 10. The device is configured to perform the following operations until the power ratio exceeds the threshold value. The device is configured to determine the first signal power of the first residual signal representative of the difference between the input signal and the half-band filtered version of the input signal. The device is configured to determine the second signal power of the second residual signal representative of the difference between a resampled signal and the half-band filtered version of the resampled signal. The resampled signal is a downsampled version of the half-band filtered version of the input signal. The device is also configured to determine the power ratio based on the first signal power and the second signal power. The device is further configured to set the input signal equal to the resampled signal if the power ratio is equal to or below the threshold value. Once the power ratio exceeds the threshold value, the device is configured to determine the resolution for the picture 10 based on a resolution of the set input signal when the power ratio exceeds the threshold value.

In an embodiment, the device is configured to determine the first signal power based on a variance of the first residual signal. The device is also configured to determine the second signal power based on a variance of the second residual signal.

In an embodiment, the device is configured to determine the first signal power $P_{r1}=\mathrm{var}(r_1(x))$. The device is also configured to determine the second signal power $P_{r2}=\mathrm{var}(r_2(x))$.

In an embodiment, the device is configured to determine the first residual signal based on a difference between the input signal and the half-band filtered version of the input signal.

In an embodiment, the device is configured to half-band filter the input signal to obtain the half-band filtered version of the input signal.

In an embodiment, the device is configured to upscale the resampled signal to obtain the half-band filtered version of the input signal.

In an embodiment, the device is configured to determine the second residual signal based on a difference between the resampled signal and the half-band filtered version of the resampled signal.

In an embodiment, the device is configured to downsample the half-band filtered version of the input signal to obtain the resampled signal.

In an embodiment, the device is configured to downsample the half-band filtered version of the input signal by a factor of 2 to obtain the resampled signal.

In an embodiment, the device is configured to half-band filter the resampled signal to obtain the half-band filtered version of the resampled signal.

In an embodiment, the device is configured to determine the power ratio based on a ratio between the first signal power and the second signal power.

In an embodiment, the device is configured to determine a resampling level for the picture 10 based on the resolution.

In an embodiment, device is configured to output a resampled version of the picture 10 at a resolution corresponding to the resolution.

The picture 10 may be a picture 10 of a video sequence 1. In such a case, the device is configured to perform the following operations for each picture 10 among multiple pictures 10, 11 of the video sequence 1 until a power ratio exceeds a threshold value. The input signal is initially set as pixel values of the picture 10.

The device is configured to determine a first signal power of a first residual signal representative of a difference between the input signal and a half-band filtered version of the input signal. The device is also configured to determine a second signal power of a second residual signal representative of a difference between a resampled signal and a half-band filtered version of the resampled signal. The resampled signal is a downsampled version of the half-band filtered version of the input signal. The device is further configured to determine the power ratio based on the first signal power and the second signal power. The device is configured to set the input signal equal to the resampled signal if the power ratio is equal to or below the threshold value. Once the power ratio exceeds the threshold value, the device is configured to determine a respective resolution for each picture 10 among the multiple pictures 10, 11 based on a resolution of the set input signal when the power ratio determined for the picture exceeds the threshold value.

Alternatively, or in addition, the device is configured to determine a first signal power of a first residual signal representative of a difference between the input signal and a half-band filtered version of the input signal and determine a second signal power of a second residual signal representative of a difference between a resampled signal and a half-band filtered version of the resampled signal. The resampled signal is a downsampled version of the half-band filtered version of the input signal. The device is configured to determine the power ratio based on the first signal powers determined for the multiple pictures 10, 11 and the second signal powers determined for the multiple pictures 10, 11. The device is also configured to set the input signal equal to the resampled signal if the power ratio is equal to or below the threshold value. The device is also configured to determine the resolution based on a resolution of the set input signal when the power ratio exceeds the threshold value.

In an embodiment, the device is configured to determine the power ratio based on an average of the first signal powers determined for the multiple pictures 10, 11 and an average of the second signal powers determined for the multiple pictures 10, 11.

Alternatively, or in addition, the device is configured to determine a first signal power of a first residual signal representative of a difference between the input signal and a half-band filtered version of the input signal. The device is also configured to determine a second signal power of a second residual signal representative of a difference between a resampled signal and a half-band filtered version of the resampled signal. The resampled signal is a downsampled version of the half-band filtered version of the input signal. The device is further configured to determine the power ratio based on the first signal power and the second signal power. The device is also configured to set the input signal equal to the resampled signal if the power ratio is equal to or below the threshold value. Once the power ratio exceeds the threshold value, the device is configured to determine the resolution based on a respective resolution of the set input signals when the respective power ratios determined for the multiple pictures 10, 11 exceeds the threshold value.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 17:
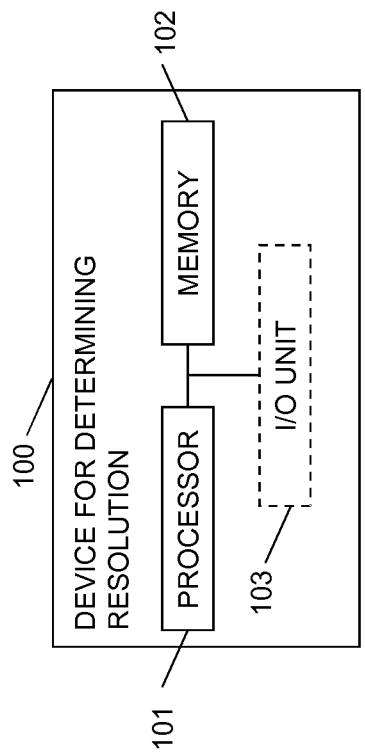
FIG. 17 is a block diagram of a device for determining a resolution according to an embodiment.

FIG. 17 is a schematic block diagram illustrating an example of a device 100 for determining a resolution for a picture according to an embodiment. In this particular example, the device 100 comprises a processor 101, such as processing circuitry, and a memory 102. The memory 102 comprises instructions executable by the processor 101.

In an embodiment, the processor 101 is operative to determine the first signal power and the second signal power. The processor 101 is also operative to determine the power ratio and set the input signal. The processor 101 is further operative to determine the resolution as described herein.

Optionally, the device 100 may also include a communication circuit, represented by a respective input/output (I/O) unit 103 in FIG. 17. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 18:
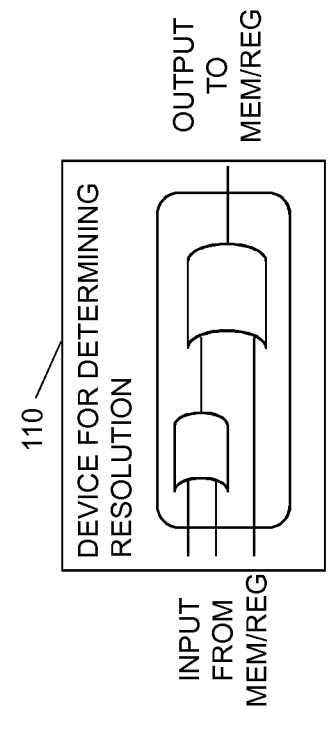
FIG. 18 is a block diagram of a device for determining a resolution according to another embodiment.

FIG. 18 is a schematic block diagram illustrating a device 110 for determining a resolution for a picture based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 19:
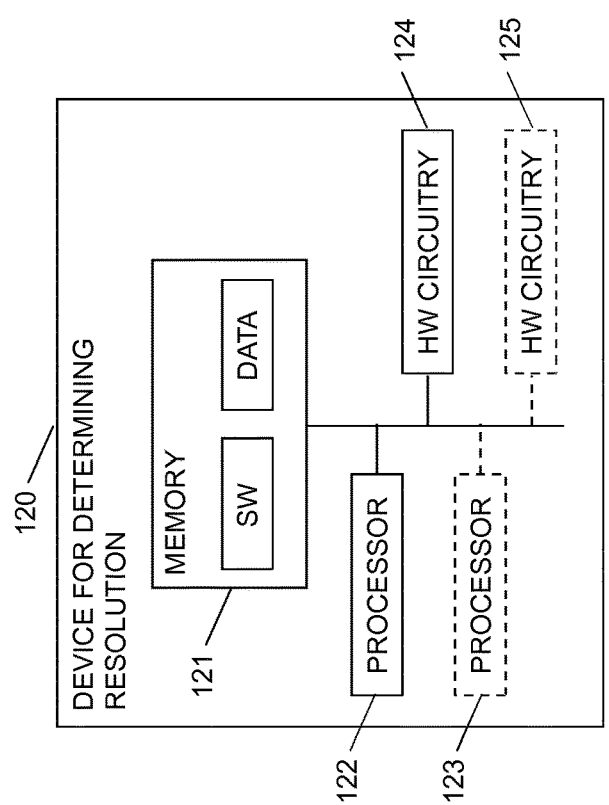
FIG. 19 is a block diagram of a device for determining a resolution according to a further embodiment.

FIG. 19 is a schematic block diagram illustrating yet another example of a device 120 for determining a resolution for a picture based on combination of both processor(s) 122, 123 and hardware circuitry 124, 125 in connection with suitable memory unit(s) 121. The overall functionality is, thus, partitioned between programmed software for execution on one or more processors 122, 123 and one or more pre-configured or possibly reconfigurable hardware circuits 124, 125. The actual hardware-software partitioning can be decided by a system designer based on a number of factors including processing speed, cost of implementation and other requirements.

Figure 20:
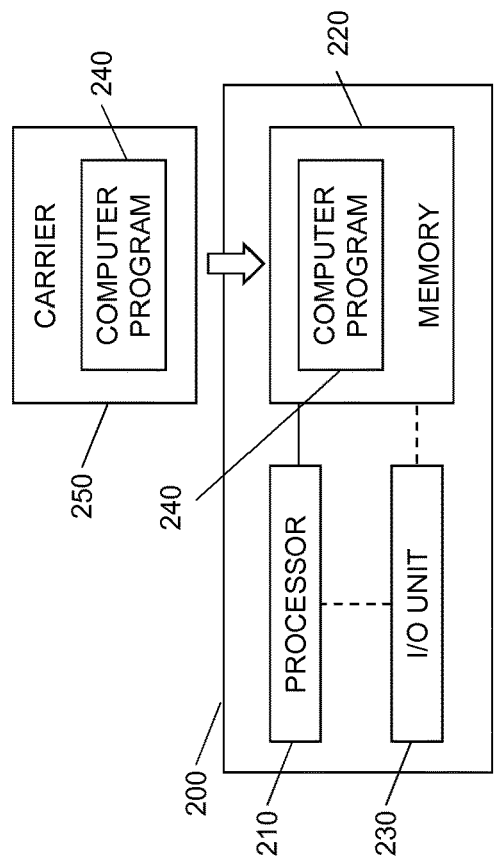
FIG. 20 schematically illustrates a computer program based implementation of an embodiment.

FIG. 20 is a computer program based implementation of a device 200 for determining a resolution for a picture according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as pictures and information of resolutions.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to, wherein an input signal is initially set as pixel values of a picture 10, perform, until a power ratio exceeds a threshold value, determining a first signal power of a first residual signal representative of a difference between the input signal and a half-band filtered version of the input signal, determining a second signal power of a second residual signal representative of a difference between a resampled signal and a half-band filtered version of the resampled signal, wherein the resampled signal is a downsampled version of the half-band filtered version of the input signal, determining the power ratio based on the first signal power and the second signal power and setting the input signal equal to the resampled signal if the power ratio is equal to or below the threshold value. The at least one processor 210 is also caused to determine a resolution for the picture 10 based on a resolution of the set input signal when the power ratio exceeds the threshold value.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 stored on a computer-readable storage medium, such as the memory 220, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

FIG. 21 is a block diagram of a device 130 for determining a resolution for a picture 10. An input signal is initially set as pixel values of a picture 10. The device 130 comprises a first signal power determining module 131 for determining, until a power ratio exceeds a threshold value, determining a first signal power of a first residual signal representative of a difference between the input signal and a half-band filtered version of the input signal. The device 130 also comprises a second signal power determining module 132 for determining, until the power ratio exceeds the threshold value, a second signal power of a second residual signal representative of a difference between a resampled signal and a half-band filtered version of the resampled signal. The resampled signal is a downsampled version of the half-band filtered version of the input signal. The device 130 further comprises a power ratio determining module 133 for determining, until the power ratio exceeds the threshold value, the power ratio based on the first signal power and the second signal power. The device 130 also comprises a setting module 134 for setting, if the power ratio is equal to or below the threshold value, the input signal equal to the resampled signal. The device 130 further comprises a resolution determining module 135 for determining a resolution for the picture 10 based on a resolution of the set input signal when the power ratio exceeds the threshold value.

Figure 24:
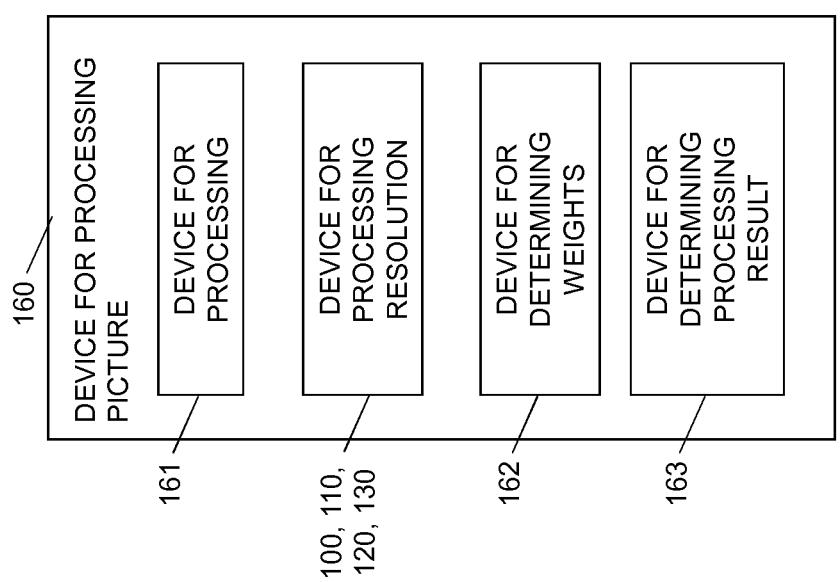
FIG. 24 is a block diagram of a device for processing a picture according to a further embodiment.

A further aspect relates to a device 140, 150, 160 for processing a picture 10 as shown in FIGS. 22 to 24. In the embodiment of FIG. 22, the device 140 comprises a device 100, 110, 120, 130 for determining a resolution for the picture 10 according to any of the embodiments, such as described in connection with any of FIGS. 17 to 21. The device 140 also comprises a device 141 configured to process a version of the picture 10 having a resolution corresponding to the resolution to obtain a processing result 20.

In the embodiment of FIG. 23, the device 150 comprises a device 151 configured to process the picture and at least one downscaled version of the picture 10 to obtain a respective processing result 20. The device 150 also comprises a device 100, 110, 120, 130 for determining a resolution for the picture 10 according to any of the embodiments, such as described in connection with any of FIGS. 17 to 21. The device 150 further comprises a device 152 configured to select a processing result 20 among the respective processing results 20 based on the resolution.

In an embodiment, the device 152 is configured to select the processing result 20 comprises selecting the processing result 20 obtained by processing a version of the picture 10 having a resolution corresponding to the resolution.

In the embodiment of FIG. 24, the device 160 comprise a device 161 configured to process the picture 10 and at least one downscaled version of the picture 10 to obtain a respective processing result 20. The device 160 also comprises a device 100, 110, 120, 130 for determining a resolution for the picture 10 according to any of the embodiments, such as described in connection with any of FIGS. 17 to 21. The device 160 further comprises a device 162 configured to determine weights for the respective processing results 20 based on the resolution. The device 160 additionally comprises a device 163 configured to determine a processing result 20 for the picture 10 by weighting the respective processing results 20 with the determined weights.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:
Consolidation of network functionality into virtualized software running on customized or generic hardware. This is sometimes referred to as network function virtualization.
Co-location of one or more application stacks, including operating system, running on separate hardware onto a single hardware platform. This is sometimes referred to as system virtualization, or platform virtualization.
Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, network devices, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level. It should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 25:
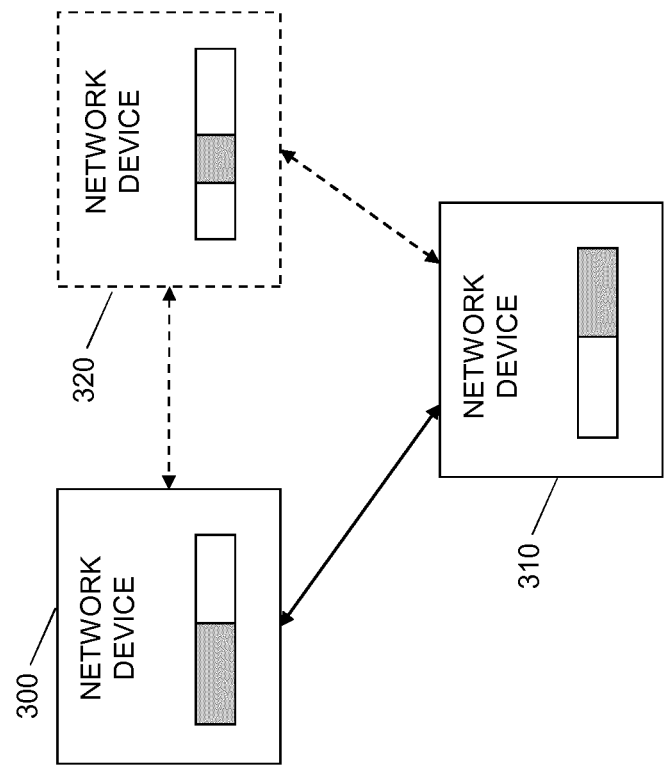
FIG. 25 schematically illustrates a distributed implementation among network devices.

FIG. 25 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Hence, yet another aspect of the embodiments relates to a network device comprising a device for determining a resolution for a picture according to the embodiments, such as illustrated in any one of FIGS. 17-21 and/or a device for processing a picture according to the embodiments, such as illustrated in any one of FIGS. 22-24.

FIG. 26 is a schematic diagram illustrating an example of a wireless communication system, including a radio access network (RAN) 31 and a core network 32 and optionally an operations and support system (OSS) 33 in cooperation with one or more cloud-based network devices 300. The figure also illustrates a wireless device 35 connected to the RAN 31 and capable of conducting wireless communication with a RAN node 30, such as a network node, a base station, node B (NB), evolved node B (eNB), next generation node B (gNB), etc.

The network device 300 illustrated as a cloud-based network device 300 in FIG. 26 may alternatively be implemented in connection with, such as at, the RAN node 30.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 27 to 31.

Figure 27:
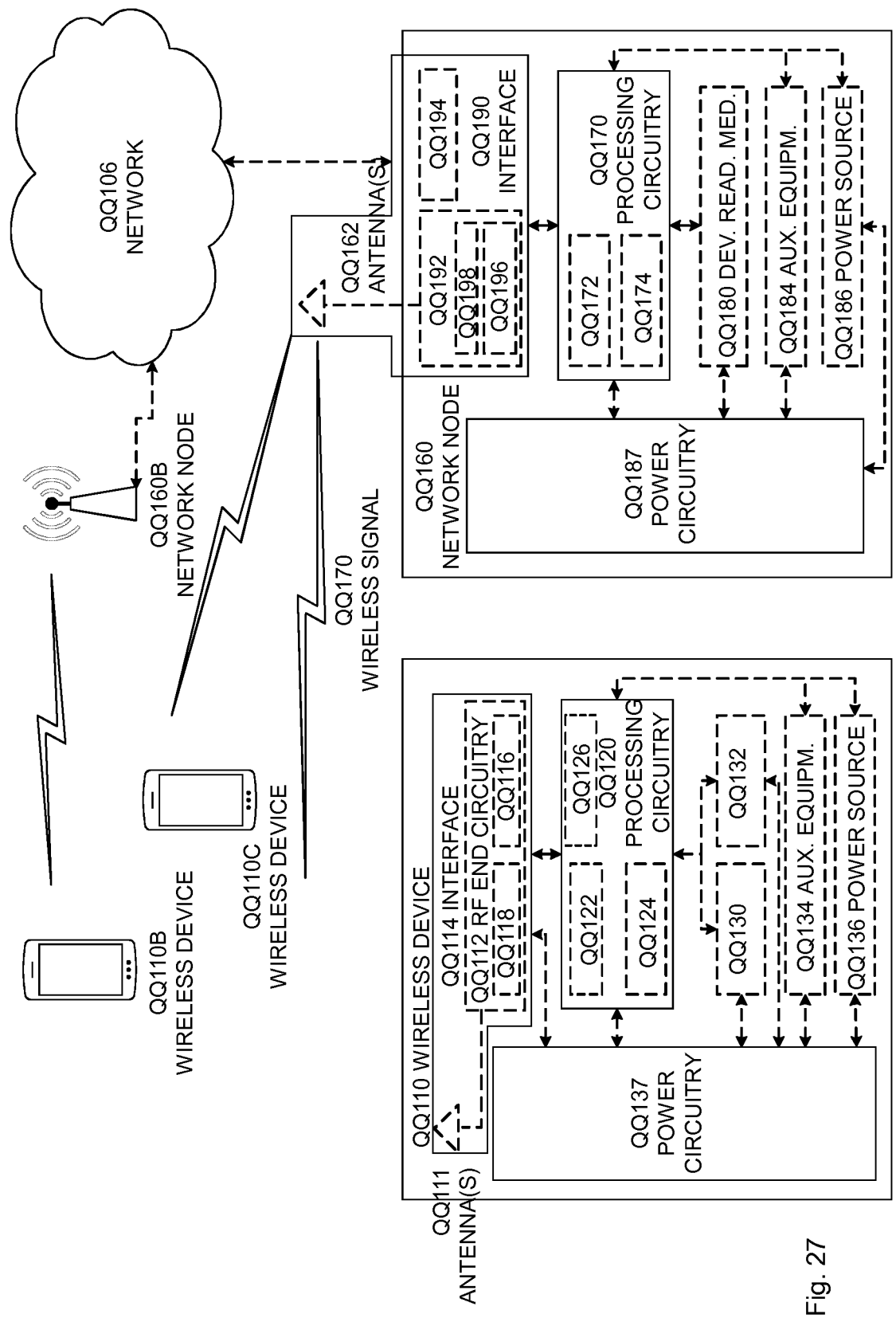
FIG. 27 is a schematic diagram illustrating an example of a wireless network in accordance with some embodiments.

FIG. 27 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 27. For simplicity, the wireless network of FIG. 27 only depicts network QQ106, network nodes QQ160 and QQ160B, and wireless devices (WDs) QQ110, QQ110B, and QQ110C. In practice, a wireless network may further include any additional elements suitable to support communication between wireless devices or between a wireless device and another communication device, such as a landline telephone, a service provider, or any other network node or end device. Of the illustrated components, network node QQ160 and WD QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment, such as MSR BSs, network controllers, such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 27, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 27 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 27 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 28:
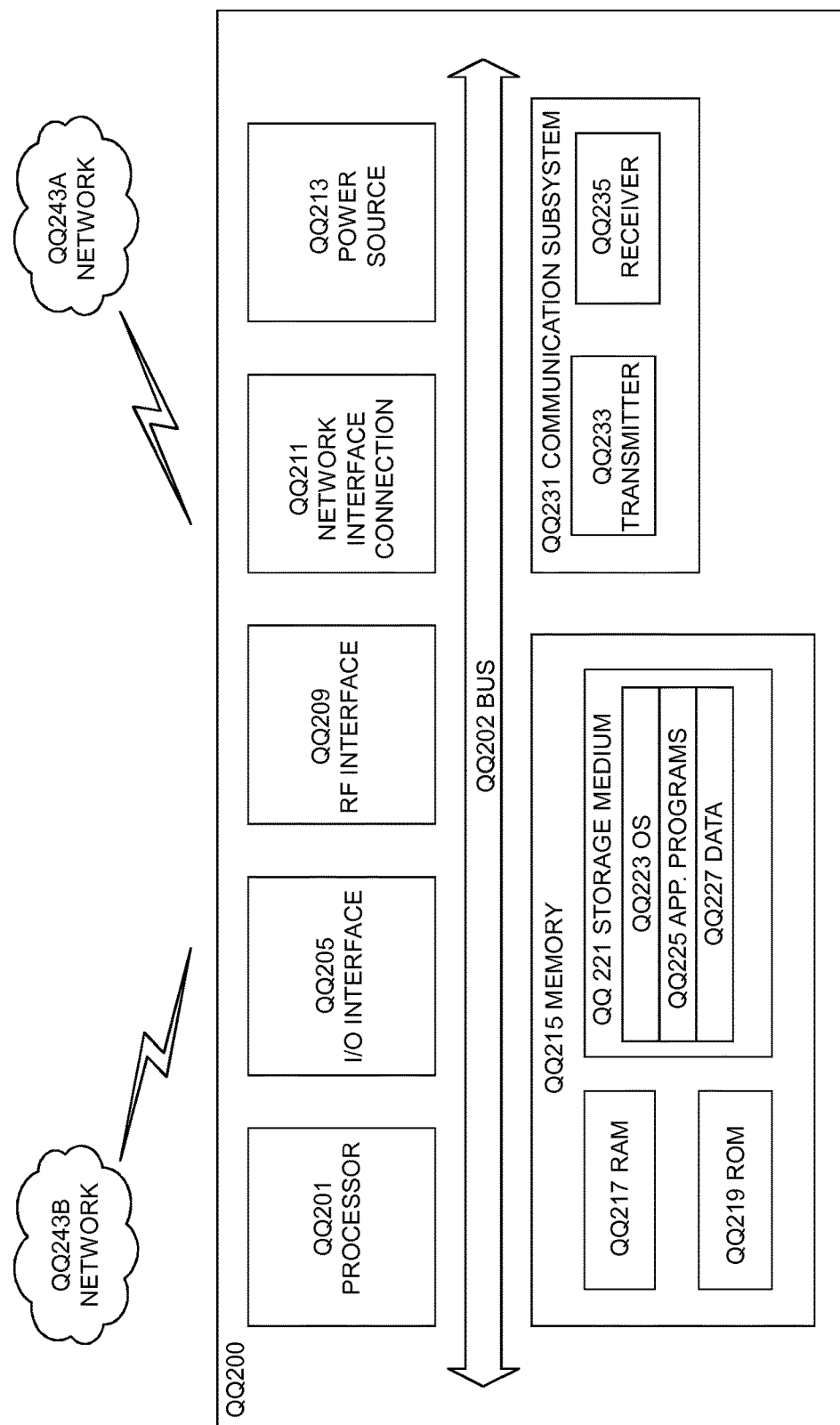
FIG. 28 is a schematic diagram illustrating an example of an embodiment of a wireless device in accordance with some embodiments.

FIG. 28 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 28, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 28 is a UE, the components discussed herein are equally applicable to a WD, and vice-versa.

In FIG. 28, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 28, or only a subset of the components. The level of integration between the components may vary from one UE to another UE. Further, certain UEs may contain multiple instances of a component, such as multiple processors, memories, transceivers, transmitters, receivers, etc.

In FIG. 28, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 28, RF interface QQ209 may be configured to provide a communication interface to RF components such as a transmitter, a receiver, and an antenna. Network connection interface QQ211 may be configured to provide a communication interface to network QQ243A. Network QQ243A may encompass wired and/or wireless networks such as a local-area network (LAN), a wide-area network (WAN), a computer network, a wireless network, a telecommunications network, another like network or any combination thereof. For example, network QQ243A may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 28, processing circuitry QQ201 may be configured to communicate with network QQ243B using communication subsystem QQ231. Network QQ243A and network QQ243B may be the same network or networks or different network or networks. Communication subsystem QQ231 may be configured to include one or more transceivers used to communicate with network QQ243B. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243B may encompass wired and/or wireless networks such as a local-area network (LAN), a wide-area network (WAN), a computer network, a wireless network, a telecommunications network, another like network or any combination thereof. For example, network QQ243B may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 29:
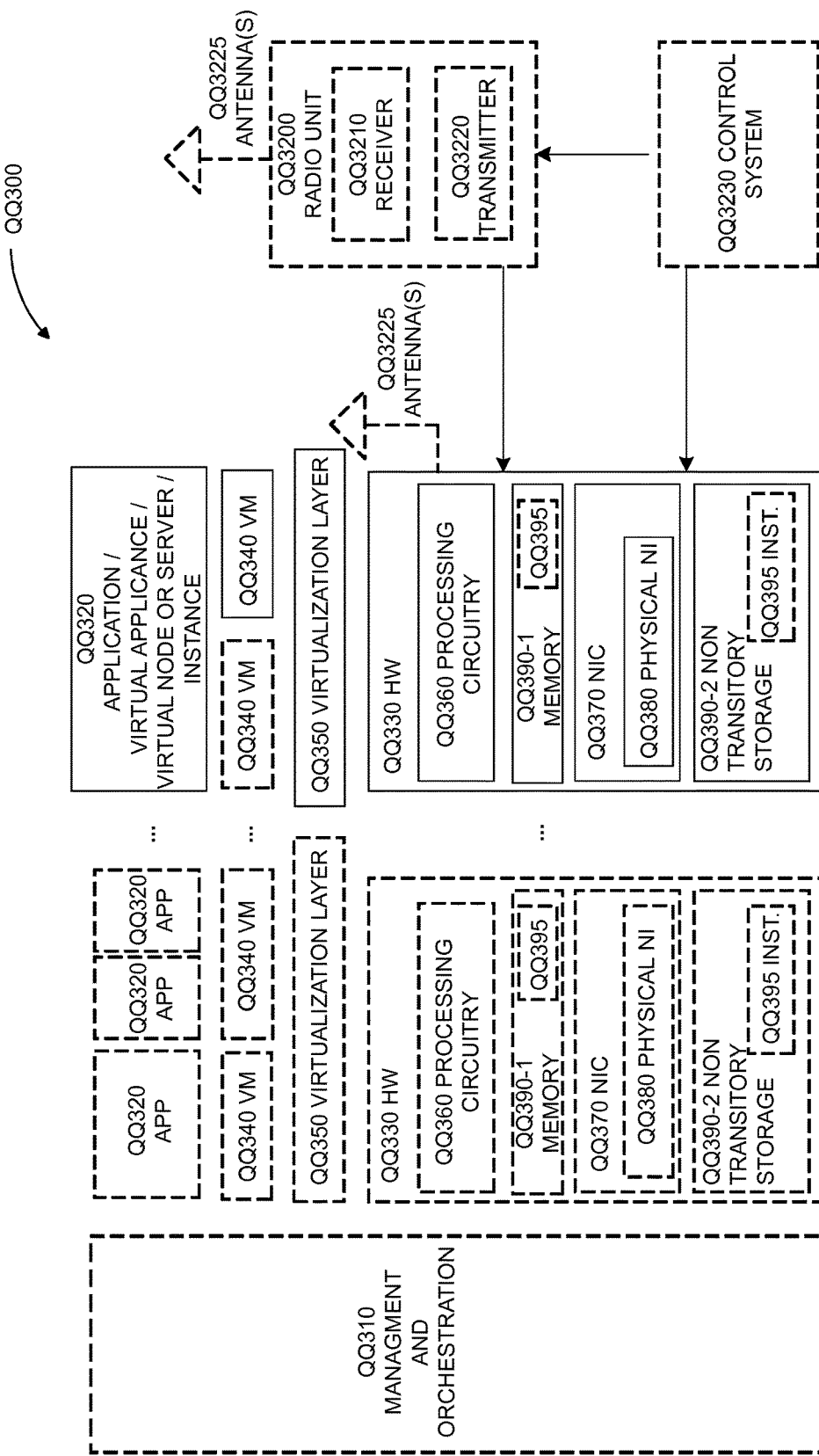
FIG. 29 is a schematic block diagram illustrating an example of a virtualization environment in which functions implemented by some embodiments may be virtualized.

FIG. 29 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analogue hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 29, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 29.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 30:
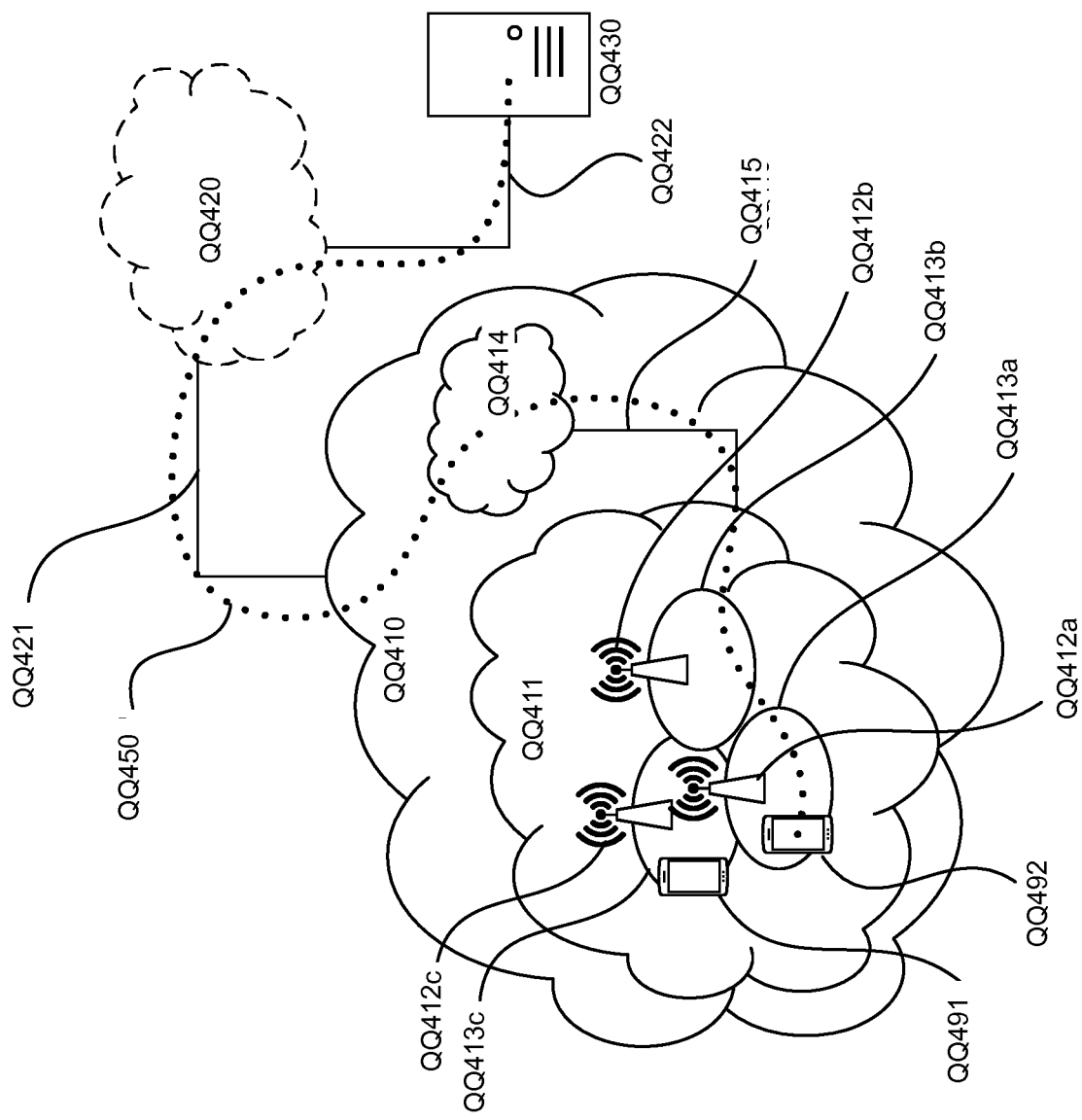
FIG. 30 is a schematic diagram illustrating an example of a telecommunication network connected via an intermediate network to a host computer in accordance with some embodiments.

FIG. 30 is a schematic diagram illustrating an example of a telecommunication network connected via an intermediate network to a host computer in accordance with some embodiments.

With reference to FIG. 30, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 30 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 31:
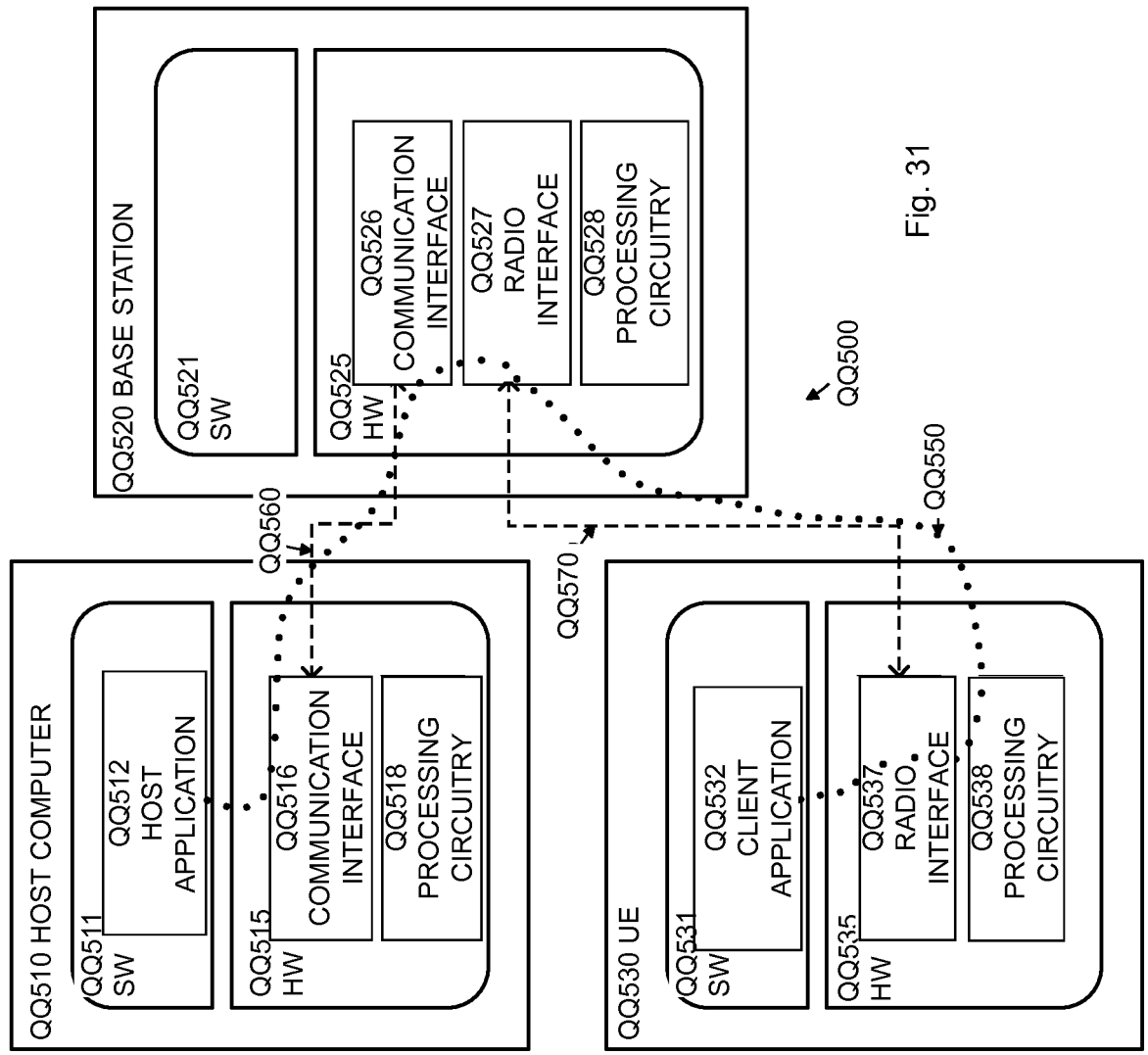
FIG. 31 is a schematic diagram illustrating an example of a host computer communicating via a base station with a user equipment over a partially wireless connection in accordance with some embodiments.

FIG. 31 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 31. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 31) served by base station QQ520. Communication interface QQ526 may be configured to facilitate connection QQ560 to host computer QQ510. Connection QQ560 may be direct or it may pass through a core network (not shown in FIG. 31) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 31 may be similar or identical to host computer QQ430, one of base stations QQ412a, QQ412b, QQ412c and one of UEs QQ491, QQ492 of FIG. 30, respectively. This is to say, the inner workings of these entities may be as shown in FIG. 31 and independently, the surrounding network topology may be that of FIG. 30.

In FIG. 31, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 33:
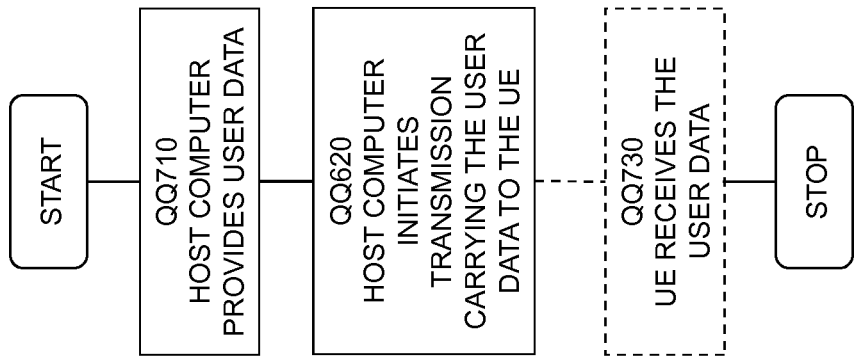
FIG. 33 is a flowchart illustrating a method implemented in a communication system in accordance with an embodiment.
Figure 32:
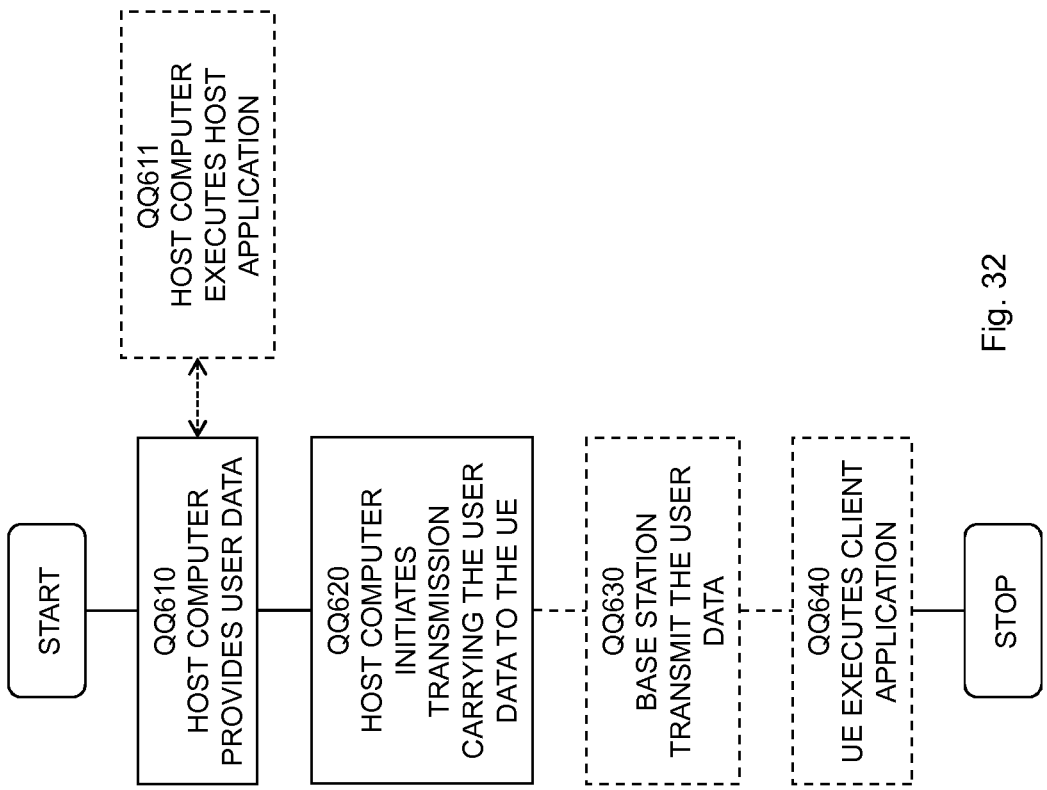
FIG. 32 is a flowchart illustrating a method implemented in a communication system in accordance with an embodiment.

FIGS. 32 and 33 are schematic flow diagrams illustrating examples of methods implemented in a communication system including, e.g. a host computer, and optionally also a base station and a user equipment in accordance with some embodiments.

FIG. 32 is a flowchart illustrating a method implemented in a communication system, in accordance with one embodiment. The communication system includes a host computer, a base station and a UE which may be those described with reference to FIGS. 27 to 31. For simplicity of the present disclosure, only drawing references to FIG. 32 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 33 is a flowchart illustrating a method implemented in a communication system, in accordance with one embodiment. The communication system includes a host computer, a base station and a UE which may be those described with reference to FIGS. 27 to 31. For simplicity of the present disclosure, only drawing references to FIG. 33 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIGS. 34 and 35 are schematic diagrams illustrating examples of methods implemented in a communication system including a host computer, a base station and a user equipment in accordance with some embodiments.

FIG. 34 is a flowchart illustrating a method implemented in a communication system, in accordance with one embodiment. The communication system includes a host computer, a base station and a UE which may be those described with reference to FIGS. 27 to 31. For simplicity of the present disclosure, only drawing references to FIG. 34 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 35 is a flowchart illustrating a method implemented in a communication system, in accordance with one embodiment. The communication system includes a host computer, a base station and a UE which may be those described with reference to FIGS. 27 to 31. For simplicity of the present disclosure, only drawing references to FIG. 35 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given.

Group A Embodiments

1. A method performed by a wireless device for resolution determination. The method comprising:
   performing until a power ratio exceeds a threshold value, wherein an input signal is initially set as pixel values of a picture:
      determining a first signal power of a first residual signal representative of a difference between the input signal and a half-band filtered version of the input signal;
      determining a second signal power of a second residual signal representative of a difference between a resampled signal and a half-band filtered version of the resampled signal, wherein the resampled signal is a downsampled version of the half-band filtered version of the input signal;
      determining the power ratio based on the first signal power and the second signal power; and
      setting the input signal equal to the resampled signal if the power ratio is equal to or below the threshold value; and
   determining a resolution for the picture based on a resolution of the set input signal when the power ratio exceeds the threshold value.
2. A method performed by a wireless device for picture processing. The method comprising:
   determining a resolution for a picture according to embodiment 1; and
   processing a version of the picture having a resolution corresponding to the resolution to obtain a processing result.
3. A method performed by a wireless device for picture processing. The method comprising:
   processing a picture and at least one downscaled version of the picture to obtain a respective processing result;
   determining a resolution for the picture according to embodiment 1; and
   selecting a processing result among the respective processing results based on the resolution.
4. A method performed by a wireless device for picture processing. The method comprising:
   processing a picture and at least one downscaled version of the picture to obtain a respective processing result;
   determining a resolution for the picture according to embodiment 1;
   determining weights for the respective processing results based on the resolution; and
   determining a processing result for the picture by weighting the respective processing results with the determined weights.
5. The method of any one of the embodiments 1 to 4, further comprising:
   providing user data; and
   forwarding the user data to a host computer via the transmission to the target network node.

Group B Embodiments

6. A method performed by a network node or device for resolution determination. The method comprising:
   performing until a power ratio exceeds a threshold value, wherein an input signal is initially set as pixel values of a picture:
      determining a first signal power of a first residual signal representative of a difference between the input signal and a half-band filtered version of the input signal;
      determining a second signal power of a second residual signal representative of a difference between a resampled signal and a half-band filtered version of the resampled signal, wherein the resampled signal is a downsampled version of the half-band filtered version of the input signal;
      determining the power ratio based on the first signal power and the second signal power; and
      setting the input signal equal to the resampled signal if the power ratio is equal to or below the threshold value; and
   determining a resolution for the picture based on a resolution of the set input signal when the power ratio exceeds the threshold value.
7. A method performed by a network node or device for picture processing. The method comprising:
   determining a resolution for a picture according to embodiment 6; and
   processing a version of the picture having a resolution corresponding to the resolution to obtain a processing result.
8. A method performed by a network node or device for picture processing. The method comprising:
   processing a picture and at least one downscaled version of the picture to obtain a respective processing result;
   determining a resolution for the picture according to embodiment 6; and
   selecting a processing result among the respective processing results based on the resolution.
9. A method performed by a network node or device for picture processing. The method comprising:
   processing a picture and at least one downscaled version of the picture to obtain a respective processing result;
   determining a resolution for the picture according to embodiment 6;
   determining weights for the respective processing results based on the resolution; and
   determining a processing result for the picture by weighting the respective processing results with the determined weights.
10. The method of any one of the embodiments 6 to 9, further comprising:
    obtaining user data; and
    forwarding the user data to a host computer or a wireless device.

Group C Embodiments

11. A wireless device comprising processing circuitry configured to perform any of the steps of any of the Group A embodiments.
12. A network node or device, such as a base station, comprising processing circuitry configured to perform any of the steps of any of the Group B embodiments.
13. A user equipment (UE) comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

14. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

15. The communication system of embodiment 14, further including the base station.

16. The communication system of embodiment 14 or 15, further including the UE, wherein the UE is configured to communicate with the base station.

17. The communication system of any one of the embodiments 14 to 16, wherein:

the processing circuitry of the host computer is configured to execute a host application, thereby providing the user data; and the UE comprises processing circuitry configured to execute a client application associated with the host application.

18. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

19. The method of embodiment 18, further comprising, at the base station, transmitting the user data.

20. The method of the embodiment 18 or 19, wherein the user data is provided at the host computer by executing a host application, the method further comprising, at the UE, executing a client application associated with the host application.

21. A user equipment (UE) configured to communicate with a base station, the UE comprising a radio interface and processing circuitry configured to perform any of the steps of any of the Group A embodiments.

22. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

23. The communication system of embodiment 22, wherein the cellular network further includes a base station configured to communicate with the UE.

24. The communication system of embodiment 22 or 23, wherein:

the processing circuitry of the host computer is configured to execute a host application, thereby providing the user data; and the UE's processing circuitry is configured to execute a client application associated with the host application.

25. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

26. The method of embodiment 25, further comprising at the UE, receiving the user data from the base station.

27. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

28. The communication system of embodiment 27, further including the UE.

29. The communication system of embodiment 27 or 28, further including the base station, wherein the base station comprises a radio interface configured to communicate with the UE and a communication interface configured to forward to the host computer the user data carried by a transmission from the UE to the base station.

30. The communication system of any one of the embodiments 27 to 29, wherein:

the processing circuitry of the host computer is configured to execute a host application; and the UE's processing circuitry is configured to execute a client application associated with the host application, thereby providing the user data.

31. The communication system of any one of the embodiments 27 to 30, wherein:

the processing circuitry of the host computer is configured to execute a host application, thereby providing request data; and the UE's processing circuitry is configured to execute a client application associated with the host application, thereby providing the user data in response to the request data.

32. A method implemented in a communication system including a host computer, a base station and a user equipment (UE), the method comprising:

at the host computer, receiving user data transmitted to the base station from the UE, wherein the UE performs any of the steps of any of the Group A embodiments.

33. The method of embodiment 32, further comprising, at the UE, providing the user data to the base station.

34. The method of embodiment 32 or 33, further comprising:

at the UE, executing a client application, thereby providing the user data to be transmitted; and at the host computer, executing a host application associated with the client application.

35. The method of any of the embodiments 32 to 34, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
36. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
37. The communication system of embodiment 36 further including the base station.
38. The communication system of embodiment 36 or 36, further including the UE, wherein the UE is configured to communicate with the base station.
39. The communication system of any one of the embodiments 36 to 38, wherein:
   the processing circuitry of the host computer is configured to execute a host application;
   the UE is configured to execute a client application associated with the host application, thereby providing the user data to be received by the host computer.
40. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
41. The method of embodiment 40, further comprising at the base station, receiving the user data from the UE.
42. The method of embodiment 40 or 41, further comprising at the base station, initiating a transmission of the received user data to the host computer.

Group D Embodiments

43. A method for determining a resolution for a picture. The method comprising:
   performing until a power ratio exceeds a threshold value, wherein an input signal is initially set as pixel values of the picture:
      determining a first signal power of a first residual signal representative of a difference between the input signal and a half-band filtered version of the input signal;
      determining a second signal power of a second residual signal representative of a difference between a resampled signal and a half-band filtered version of the resampled signal, wherein the resampled signal is a downsampled version of the half-band filtered version of the input signal;
      determining the power ratio based on the first signal power and the second signal power; and
      setting the input signal equal to the resampled signal if the power ratio is equal to or below the threshold value; and
   determining the resolution for the picture based on a resolution of the set input signal when the power ratio exceeds the threshold value.
44. A method for processing a picture. The method comprising:
   determining a resolution for the picture according to embodiment 43; and
   processing a version of the picture having a resolution corresponding to the resolution to obtain a processing result.
45. A method for processing a picture. The method comprising:
   processing the picture and at least one downscaled version of the picture to obtain a respective processing result;
   determining a resolution for the picture according to embodiment 43; and
   selecting a processing result among the respective processing results based on the resolution.
46. A method for processing a picture. The method comprising:
   processing a picture and at least one downscaled version of the picture to obtain a respective processing result;
   determining a resolution for the picture according to embodiment 43;
   determining weights for the respective processing results based on the resolution; and
   determining a processing result for the picture by weighting the respective processing results with the determined weights.
47. A device configured to determining a resolution for a picture. The device is configured to
   perform until a power ratio exceeds a threshold value, wherein an input signal is initially set as pixel values of the picture:
      determining a first signal power of a first residual signal representative of a difference between the input signal and a half-band filtered version of the input signal;
      determining a second signal power of a second residual signal representative of a difference between a resampled signal and a half-band filtered version of the resampled signal, wherein the resampled signal is a downsampled version of the half-band filtered version of the input signal;
      determining the power ratio based on the first signal power and the second signal power; and
      setting the input signal equal to the resampled signal if the power ratio is equal to or below the threshold value; and
   determine the resolution for the picture based on a resolution of the set input signal when the power ratio exceeds the threshold value.
48. A device configured to process a picture. The device is configured to
   determine a resolution for the picture using a device according to embodiment 47; and
   process a version of the picture having a resolution corresponding to the resolution to obtain a processing result.
49. A device configured to process a picture. The device is configured to
   process the picture and at least one downscaled version of the picture to obtain a respective processing result;
   determine a resolution for the picture using a device according to embodiment 47; and
   select a processing result among the respective processing results based on the resolution.
50. A device configured to process a picture. The device is configured to process the picture and at least one downscaled version of the picture to obtain a respective processing result;

determine a resolution for the picture using a device according to embodiment 47;

determine weights for the respective processing results based on the resolution; and determine a processing result for the picture by weighting the respective processing results with the determined weights.

51. A wireless device comprising a device according to any one of the embodiments 47 to 50.

52. A network node comprising a device according to any one of the embodiments 47 to 50.

53. A network device comprising a device according to any one of the embodiments 47 to 50.

54. A computer program comprising instructions, which when executed by at least one processor, cause the at least one processor to:

perform until a power ratio exceeds a threshold value, wherein an input signal is initially set as pixel values of the picture:

determining a first signal power of a first residual signal representative of a difference between the input signal and a half-band filtered version of the input signal;

determining a second signal power of a second residual signal representative of a difference between a resampled signal and a half-band filtered version of the resampled signal, wherein the resampled signal is a downsampled version of the half-band filtered version of the input signal;

determining the power ratio based on the first signal power and the second signal power; and setting the input signal equal to the resampled signal if the power ratio is equal to or below the threshold value; and determine the resolution for the picture based on a resolution of the set input signal when the power ratio exceeds the threshold value.

55. A computer program comprising instructions, which when executed by at least one processor, cause the at least one processor to determine a resolution for the picture using a computer program according to embodiment 54; and process a version of the picture having a resolution corresponding to the resolution to obtain a processing result.

56. A computer program comprising instructions, which when executed by at least one processor, cause the at least one processor to process the picture and at least one downscaled version of the picture to obtain a respective processing result;

determine a resolution for the picture using a computer program according to embodiment 54; and select a processing result among the respective processing results based on the resolution.

57. A computer program comprising instructions, which when executed by at least one processor, cause the at least one processor to process the picture and at least one downscaled version of the picture to obtain a respective processing result;

determine a resolution for the picture using a computer program according to embodiment 54;

determine weights for the respective processing results based on the resolution; and determine a processing result for the picture by weighting the respective processing results with the determined weights.

58. A computer-program product comprising a computer-readable medium having stored thereon a computer program of any of the embodiments 54 to 57.

59. An apparatus for determining a resolution for a picture. The apparatus comprises:

a module for performing until a power ratio exceeds a threshold value, wherein an input signal is initially set as pixel values of the picture:

determining a first signal power of a first residual signal representative of a difference between the input signal and a half-band filtered version of the input signal;

determining a second signal power of a second residual signal representative of a difference between a resampled signal and a half-band filtered version of the resampled signal, wherein the resampled signal is a downsampled version of the half-band filtered version of the input signal;

determining the power ratio based on the first signal power and the second signal power; and setting the input signal equal to the resampled signal if the power ratio is equal to or below the threshold value; and a module for determining the resolution for the picture based on a resolution of the set input signal when the power ratio exceeds the threshold value.

60. An apparatus for processing a picture. The apparatus comprises:

an apparatus for determining a resolution for the picture according to embodiment 59; and a module for processing a version of the picture having a resolution corresponding to the resolution to obtain a processing result.

61. An apparatus for processing a picture. The apparatus comprises:

a module for processing the picture and at least one downscaled version of the picture to obtain a respective processing result;

an apparatus for determining a resolution for the picture according to embodiment 59; and a module for selecting a processing result among the respective processing results based on the resolution.

62. An apparatus for processing a picture. The apparatus comprises:

a module for processing the picture and at least one downscaled version of the picture to obtain a respective processing result;

an apparatus for determining a resolution for the picture according to embodiment 59;

a module for determining weights for the respective processing results based on the resolution; and a module for determining a processing result for the picture by weighting the respective processing results with the determined weights.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Proakis and Manolakis, Digital Signal Processing, 4$^{th}$ Edition, Pearson, 2006.
[2] Goodman and Carey, Nine digital filters for decimation and interpolation, *IEEE Transactions on Acoustics, Speech, and Signal Processing*, 25(2): 121-126, 1977.
[3] VMAF—Video Multi-method Assessment Fusion, video database, https://github.com/Nefflix/vmaf/blob/master/resource/doc/datasets.md, as present on 6 Sep. 2018, https://drive.google.com/folderview?id=0B3YWNICYMBIweGdJbERIUG9zc0k&usp=sharing, as present on 6 Sep. 2018.
[4] VQEG—Video Quality Experts Group", video database, http://www.cdvl.org/, as present on 6 Sep. 2018.
[5] Lin et al, MCL-V: A streaming video quality assessment database, *Journal of Visual Communication and Image Representation*, 30: 1-9, 2015, http://mcl.usc.edu/mcl-v-database/.

The invention claimed is:

1. A method of determining a resolution for a picture, the method comprising, wherein an input signal is initially set as pixel values of the picture:
performing until a power ratio exceeds a threshold value:
determining a first signal power of a first residual signal representative of a difference between the input signal and a half-band filtered version of the input signal;
determining a second signal power of a second residual signal representative of a difference between a resampled signal and a half-band filtered version of the resampled signal, wherein the resampled signal is a downsampled version of the half-band filtered version of the input signal;
determining the power ratio based on the first signal power and the second signal power; and
setting the input signal equal to the resampled signal if the power ratio is equal to or below the threshold value; and
determining the resolution for the picture based on a resolution of the set input signal when the power ratio exceeds the threshold value.

2. The method of claim 1, comprising:
setting the input signal initially as the pixel values of the picture; and
performing until the power ratio exceeds the threshold value:
determining the first signal power of the first residual signal representative of the difference between the input signal and the half-band filtered version of the input signal;
determining the second signal power of the second residual signal representative of the difference between the resampled signal and the half-band filtered version of the resampled signal, wherein the resampled signal is the downsampled version of the half-band filtered version of the input signal;
determining the power ratio based on the first signal power and the second signal power; and
setting the input signal equal to the resampled signal if the power ratio is equal to or below the threshold value; and
determining the resolution for the picture based on the resolution of the set input signal when the power ratio exceeds the threshold value.

3. The method of claim 1, wherein
determining the first signal power comprises determining the first signal power based on a variance of the first residual signal; and
determining the second signal power comprises determining the second signal power based on a variance of the second residual signal.

4. The method of claim 1, further comprising determining the first residual signal based on a difference between the input signal and the half-band filtered version of the input signal.

5. The method of claim 4, further comprising obtaining the half-band filtered version of the input signal by: half-band filtering the input signal to obtain the half-band filtered version of the input signal or upscaling the resampled signal to obtain the half-band filtered version of the input signal.

6. The method of claim 1, further comprising determining the second residual signal based on a difference between the resampled signal and the half-band filtered version of the resampled signal.

7. The method of claim 1, wherein determining the power ratio comprises determining the power ratio based on a ratio between the first signal power and the second signal power.

8. The method of claim 1, further comprising determining a resampling level for the picture based on the resolution.

9. The method of claim 1, further comprising outputting a resampled version of the picture at a resolution corresponding to the resolution.

10. The method of claim 1, wherein
the picture is a picture of a video sequence; and
the method comprising:
performing, for each picture among multiple pictures of the video sequence and the input signal is initially set as pixel values of the picture, until a power ratio exceeds a threshold value:
determining a first signal power of a first residual signal representative of a difference between the input signal and a half-band filtered version of the input signal;
determining a second signal power of a second residual signal representative of a difference between a resampled signal and a half-band filtered version of the resampled signal, wherein the resampled signal is a downsampled version of the half-band filtered version of the input signal;
determining the power ratio based on the first signal power and the second signal power; and
setting the input signal equal to the resampled signal if the power ratio is equal to or below the threshold value; and
determining a respective resolution for each picture among the multiple pictures based on a resolution of the set input signal when the power ratio determined for the picture exceeds the threshold value.

11. The method of claim 1, wherein
the picture is a picture of a video sequence; and
the method comprising:
performing, for each picture among multiple pictures of the video sequence and the input signal is initially set as pixel values of the picture, until a power ratio exceeds a threshold value:

determining a first signal power of a first residual signal representative of a difference between the input signal and a half-band filtered version of the input signal;

determining a second signal power of a second residual signal representative of a difference between a resampled signal and a half-band filtered version of the resampled signal, wherein the resampled signal is a downsampled version of the half-band filtered version of the input signal;

determining the power ratio based on the first signal powers determined for the multiple pictures and the second signal powers determined for the multiple pictures; and setting the input signal equal to the resampled signal if the power ratio is equal to or below the threshold value; and determining the resolution based on a resolution of the set input signal when the power ratio exceeds the threshold value.

12. The method of claim 11, wherein determining the power ratio comprises determining the power ratio based on an average of the first signal powers determined for the multiple pictures and an average of the second signal powers determined for the multiple pictures.

13. The method of claim 1, wherein
the picture is a picture of a video sequence; and
the method comprises:
performing, for each picture among multiple pictures of the video sequence and the input signal is initially set as pixel values of the picture, until a power ratio exceeds a threshold value:
determining a first signal power of a first residual signal representative of a difference between the input signal and a half-band filtered version of the input signal;
determining a second signal power of a second residual signal representative of a difference between a resampled signal and a half-band filtered version of the resampled signal, wherein the resampled signal is a downsampled version of the half-band filtered version of the input signal;
determining the power ratio based on the first signal power and the second signal power; and
setting the input signal equal to the resampled signal if the power ratio is equal to or below the threshold value; and
determining the resolution based on a respective resolution of the set input signals when the respective power ratios determined for the multiple pictures exceeds the threshold value.

14. A device for determining a resolution for a picture, wherein an input signal is initially set as pixel values of the picture, the device comprising:
a processor; and
a memory comprising instructions executable by the processor, whereby the processor is configured to:
perform until a power ratio exceeds a threshold value:
determining a first signal power of a first residual signal representative of a difference between the input signal and a half-band filtered version of the input signal;
determining a second signal power of a second residual signal representative of a difference between a resampled signal and a half-band filtered version of the resampled signal, wherein the resampled signal is a downsampled version of the half-band filtered version of the input signal;

determining the power ratio based on the first signal power and the second signal power; and setting the input signal equal to the resampled signal if the power ratio is equal to or below the threshold value; and determine the resolution for the picture based on a resolution of the set input signal when the power ratio exceeds the threshold value.

15. The device of claim 14, wherein the device is configured to:
set the input signal initially as the pixel values of the picture;
perform until the power ratio exceeds the threshold value:
determining the first signal power of the first residual signal representative of the difference between the input signal and the half-band filtered version of the input signal;
determining the second signal power of the second residual signal representative of the difference between the resampled signal and the half-band filtered version of the resampled signal, wherein the resampled signal is the downsampled version of the half-band filtered version of the input signal;
determining the power ratio based on the first signal power and the second signal power; and
setting the input signal equal to the resampled signal if the power ratio is equal to or below the threshold value; and
determine the resolution for the picture based on the resolution of the set input signal when the power ratio exceeds the threshold value.

16. The device of claim 14, wherein the device is configured to:
determine the first signal power based on a variance of the first residual signal; and
determine the second signal power based on a variance of the second residual signal.

17. The device of claim 14, wherein
the picture is a picture of a video sequence; and
the device is configured to:
perform, for each picture among multiple pictures of the video sequence and the input signal is initially set as pixel values of the picture, until a power ratio exceeds a threshold value:
determining a first signal power of a first residual signal representative of a difference between the input signal and a half-band filtered version of the input signal;
determining a second signal power of a second residual signal representative of a difference between a resampled signal and a half-band filtered version of the resampled signal, wherein the resampled signal is a downsampled version of the half-band filtered version of the input signal;
determining the power ratio based on the first signal power and the second signal power; and
setting the input signal set equal to the resampled signal if the power ratio is equal to or below the threshold value; and
determine a respective resolution for each picture among the multiple pictures based on a resolution of the set input signal when the power ratio determined for the picture exceeds the threshold value.

18. The device of claim 14, wherein
the picture is a picture of a video sequence; and
the device is configured to:
- perform, for each picture among multiple pictures of the video sequence and the input signal is initially set as pixel values of the picture, until a power ratio exceeds a threshold value:
    - determining a first signal power of a first residual signal representative of a difference between the input signal and a half-band filtered version of the input signal;
    - determining a second signal power of a second residual signal representative of a difference between a resampled signal and a half-band filtered version of the resampled signal, wherein the resampled signal is a downsampled version of the half-band filtered version of the input signal;
    - determining the power ratio based on the first signal powers determined for the multiple pictures and the second signal powers determined for the multiple pictures; and
    - setting the input signal set equal to the resampled signal if the power ratio is equal to or below the threshold value; and
- determine the resolution based on a resolution of the set input signal when the power ratio exceeds the threshold value.

19. The device of claim 18, wherein the device is configured to determine the power ratio based on an average of the first signal powers determined for the multiple pictures and an average of the second signal powers determined for the multiple pictures.

20. The device of claim 14, wherein
the picture is a picture of a video sequence; and
the device is configured to:
- perform, for each picture among multiple pictures of the video sequence and the input signal is initially set as pixel values of the picture, until a power ratio exceeds a threshold value:
    - determining a first signal power of a first residual signal representative of a difference between the input signal and a half-band filtered version of the input signal;
    - determining a second signal power of a second residual signal representative of a difference between a resampled signal and a half-band filtered version of the resampled signal, wherein the resampled signal is a downsampled version of the half-band filtered version of the input signal;
    - determining the power ratio based on the first signal power and the second signal power; and
    - setting the input signal equal to the resampled signal if the power ratio is equal to or below the threshold value; and
- determine the resolution based on a respective resolution of the set input signals when the respective power ratios determined for the multiple pictures exceeds the threshold value.

* * * * *